United States Patent
Noh et al.

(10) Patent No.: US 10,388,098 B2
(45) Date of Patent: Aug. 20, 2019

(54) APPARATUS AND METHOD OF PROCESSING ANTI-COUNTERFEITING PATTERN, AND APPARATUS AND METHOD OF DETECTING ANTI-COUNTERFEITING PATTERN

(71) Applicant: KOREA INSTITUTE OF MACHINERY & MATERIALS, Daejeon (KR)

(72) Inventors: Ji-Whan Noh, Daejeon (KR); Hee-Shin Kang, Daejeon (KR); Hyon Kee Sohn, Daejeon (KR); Jeng-O Kim, Daejeon (KR)

(73) Assignee: KOREA INSTITUTE OF MACHINERY & MATERIALS, Daejeon (KR)

(*) Notice: Subject to any disclaimer, the term of this patent is extended or adjusted under 35 U.S.C. 154(b) by 0 days.

(21) Appl. No.: 15/116,293

(22) PCT Filed: Feb. 6, 2015

(86) PCT No.: PCT/KR2015/001251
§ 371 (c)(1),
(2) Date: Aug. 3, 2016

(87) PCT Pub. No.: WO2015/119459
PCT Pub. Date: Aug. 13, 2015

(65) Prior Publication Data
US 2016/0350996 A1    Dec. 1, 2016

(30) Foreign Application Priority Data

Feb. 7, 2014 (KR) .................. 10-2014-0014248
Feb. 7, 2014 (KR) .................. 10-2014-0014250
(Continued)

(51) Int. Cl.
*G07D 7/12* (2016.01)
*B23K 26/359* (2014.01)
(Continued)

(52) U.S. Cl.
CPC ............. *G07D 7/12* (2013.01); *B23K 26/359* (2015.10); *B23K 26/362* (2013.01);
(Continued)

(58) Field of Classification Search
CPC .. G07D 7/12; G07D 7/06; G07D 7/20; G07D 7/0032; G07D 7/206; G07D 11/0066;
(Continued)

(56) References Cited

U.S. PATENT DOCUMENTS 3,848,104 A * 11/1974 Locke .................. B23K 26/073
148/565
4,079,230 A * 3/1978 Miyauchi ............... B23K 26/08
219/121.75
(Continued)

FOREIGN PATENT DOCUMENTS

EP    00725375    12/1999
EP    1721695     11/2006
(Continued)

OTHER PUBLICATIONS https://en.wikipedia.org/wiki/Telecentric_lens.*
(Continued)

*Primary Examiner* — Mohamed K Amara
(74) *Attorney, Agent, or Firm* — Lex IP Meister, PLLC

(57) ABSTRACT

The present invention provides an anti-counterfeiting pattern processing apparatus and a method thereof that quickly process the anti-counterfeiting pattern with a low cost by forming a fine pattern of a nanometer or micrometer scale by using a laser processing system, and an apparatus and a method thereof detecting the anti-counterfeiting pattern of
(Continued)

US 10,388,098 B2

Page 2 the micrometer or nanometer scale by using a laser measuring system.

4 Claims, 34 Drawing Sheets

(30) Foreign Application Priority Data

| Nov. 28, 2014 | (KR) | ........................ 10-2014-0169132 |
| Feb. 5, 2015 | (KR) | ........................ 10-2015-0018147 |
| Feb. 5, 2015 | (KR) | ........................ 10-2015-0018148 |

(51) Int. Cl.

| G07D 7/06 | (2006.01) |
| B42D 25/328 | (2014.01) |
| B42D 25/41 | (2014.01) |
| B42D 25/324 | (2014.01) |
| B23K 26/362 | (2014.01) |
| G06K 9/20 | (2006.01) |
| G06K 9/46 | (2006.01) |

(52) U.S. Cl.
CPC .......... *B42D 25/324* (2014.10); *B42D 25/328* (2014.10); *B42D 25/41* (2014.10); *G06K 9/2036* (2013.01); *G06K 9/4671* (2013.01); *G07D 7/06* (2013.01)

(58) Field of Classification Search
CPC ...... G07D 7/202; G07D 7/0034; G07D 7/004; G07D 2207/00; B23K 26/361; B23K 26/362; B23K 26/0087; B23K 26/36; B23K 26/082; B23K 26/364; B23K 26/03; B23K 26/0643; B23K 26/064; G06K 9/4671; G06K 9/2036; G06K 9/6202; G06K 9/46; G06K 9/4604; G06K 9/3241; G06K 19/16; G06K 2209/401; B42D 25/324; B42D 25/41; B42D 25/328; B42D 25/29; B42D 2035/20; B42D 25/342; B42D 2035/44; B42D 2033/18; B42D 25/30; B41M 3/14; B41M 3/008; B41M 3/003; G03H 1/0011; G03H 1/0248; G03H 1/0252; G03H 1/0236; G03H 1/028

See application file for complete search history.

(56) References Cited

U.S. PATENT DOCUMENTS

| 4,104,489 | A | * | 8/1978 | Satoh | .................... G11B 7/0065 |
| | | | | | 359/29 |
| 4,420,829 | A | * | 12/1983 | Carlson | .................... G03H 1/26 |
| | | | | | 365/125 |
| 4,468,551 | A | * | 8/1984 | Neiheisel | ............. B23K 26/073 |
| | | | | | 219/121.6 |
| 4,500,771 | A | * | 2/1985 | Miller | ................ B23K 26/0846 |
| | | | | | 219/121.68 |
| 4,541,712 | A | | 9/1985 | Whitney | |
| 4,929,823 | A | * | 5/1990 | Kato | .................... G11B 7/0912 |
| | | | | | 250/201.5 |
| 5,072,091 | A | * | 12/1991 | Nagata | .................. B23K 26/06 |
| | | | | | 219/121.68 |
| 5,212,572 | A | * | 5/1993 | Krantz | .................... G02B 5/32 |
| | | | | | 250/201.5 |
| 5,339,305 | A | * | 8/1994 | Curtis | .................. G03H 1/0406 |
| | | | | | 359/29 |
| 5,675,691 | A | | 10/1997 | Edlinger | |
| 5,896,359 | A | * | 4/1999 | Stoll | .................... G03H 1/0248 |
| | | | | | 359/2 |
| 5,986,781 | A | * | 11/1999 | Long | .................... G03H 1/041 |
| | | | | | 349/201 |
| 6,157,473 | A | * | 12/2000 | Jang | .......................... G03H 1/02 |
| | | | | | 359/11 |
| 7,148,468 | B2 | * | 12/2006 | Jung | .................... G11B 7/0065 |
| | | | | | 250/225 |
| 7,995,196 | B1 | * | 8/2011 | Fraser | ................ G06K 9/00577 |
| | | | | | 356/71 |
| 8,144,399 | B2 | * | 3/2012 | Steenblik | ............... B42D 25/29 |
| | | | | | 359/618 |
| 8,488,242 | B2 | * | 7/2013 | Hill | .................... G02B 5/1842 |
| | | | | | 359/565 |
| 8,797,399 | B2 | * | 8/2014 | Matsuda | ............ G01B 11/2545 |
| | | | | | 348/92 |
| 9,157,790 | B2 | * | 10/2015 | Shpunt | .................... G06T 15/00 |
| 9,541,383 | B2 | * | 1/2017 | Abovitz | ............. G06K 9/00671 |
| 9,759,666 | B2 | * | 9/2017 | Otani | .................... G01N 21/21 |
| 9,885,771 | B2 | * | 2/2018 | Nagalla | .................. G06F 3/017 |
| 10,161,742 | B2 | * | 12/2018 | Patel | .................. G01B 11/0691 |
| 2002/0131597 | A1 | * | 9/2002 | Hori | .................... G06K 7/10574 |
| | | | | | 380/256 |
| 2002/0154290 | A1 | * | 10/2002 | Tompkin | ................ A44C 21/00 |
| | | | | | 356/71 |
| 2004/0182842 | A1 | * | 9/2004 | Denney | ................ B23K 26/032 |
| | | | | | 219/121.84 |
| 2004/0247874 | A1 | * | 12/2004 | Ryzi | .................... G03H 1/0244 |
| | | | | | 428/410 |
| 2005/0038756 | A1 | * | 2/2005 | Nagel | .................. G06K 19/086 |
| | | | | | 705/76 |
| 2005/0063027 | A1 | * | 3/2005 | Durst, Jr. | ............. G06K 7/1417 |
| | | | | | 359/2 |
| 2005/0070035 | A1 | * | 3/2005 | Yazaki | .................. B23K 26/032 |
| | | | | | 438/22 |
| 2006/0003295 | A1 | * | 1/2006 | Hersch | ................ B42D 25/342 |
| | | | | | 434/110 |
| 2006/0039053 | A1 | | 2/2006 | Yang et al. | |
| 2007/0211318 | A1 | * | 9/2007 | Miura | .................. G03H 1/2286 |
| | | | | | 359/2 |
| 2008/0059094 | A1 | * | 3/2008 | Shimura | .............. G01N 21/94 |
| | | | | | 702/81 |
| 2008/0113493 | A1 | | 5/2008 | Chall | |
| 2008/0118143 | A1 | * | 5/2008 | Gordon | ............. G01B 11/2513 |
| | | | | | 382/154 |
| 2008/0134920 | A1 | * | 6/2008 | Foresti | .................... B41M 3/14 |
| | | | | | 101/491 |
| 2008/0287930 | A1 | * | 11/2008 | Rapoport | ............ A61B 18/203 |
| | | | | | 606/9 |
| 2009/0174944 | A1 | * | 7/2009 | Yuasa | .................. G02B 5/1857 |
| | | | | | 359/566 |
| 2010/0060958 | A1 | * | 3/2010 | Kim | .................... G02B 5/1866 |
| | | | | | 359/8 |
| 2010/0074532 | A1 | * | 3/2010 | Gordon | .................. G01B 11/25 |
| | | | | | 382/203 |
| 2010/0116156 | A1 | * | 5/2010 | Spoto | .................... G03H 1/028 |
| | | | | | 101/28 |
| 2010/0133243 | A1 | * | 6/2010 | Nomaru | ............... B23K 26/032 |
| | | | | | 219/121.67 |
| 2011/0037149 | A1 | | 2/2011 | Fukuyo et al. | |
| 2012/0128900 | A1 | * | 5/2012 | Furuie | .................... B41M 3/148 |
| | | | | | 428/29 |
| 2012/0223061 | A1 | | 9/2012 | Atsumi | |
| 2012/0229368 | A1 | * | 9/2012 | Watanabe | ................ G07D 7/12 |
| | | | | | 345/32 |
| 2013/0182897 | A1 | * | 7/2013 | Holz | .................. G06K 9/00711 |
| | | | | | 382/103 |
| 2013/0320099 | A1 | * | 12/2013 | Acton | .................. G06K 19/06056 |
| | | | | | 235/494 |
| 2014/0080040 | A1 | * | 3/2014 | Fontecchio | ......... G02F 1/13342 |
| | | | | | 430/2 |
| 2014/0104686 | A1 | * | 4/2014 | Yuasa | .................. B23K 26/0084 |
| | | | | | 359/575 |
| 2014/0306441 | A1 | * | 10/2014 | Lister | .................... G03C 5/08 |
| | | | | | 283/85 |
| 2015/0111365 | A1 | | 4/2015 | Fukuyo et al. | |
| 2015/0122786 | A1 | * | 5/2015 | Huang | ............... B23K 26/0648 |
| | | | | | 219/121.69 |

(56) References Cited

U.S. PATENT DOCUMENTS

| | | | | |
|---|---|---|---|---|
| 2015/0258835 A1* | 9/2015 | Fischer | | B42D 25/328 356/71 |
| 2015/0258837 A1* | 9/2015 | Ritter | | B41M 3/148 283/67 |
| 2015/0332127 A1* | 11/2015 | Zheng | | G06T 7/11 382/165 |
| 2016/0263931 A1* | 9/2016 | Garnier | | B41M 3/148 |

FOREIGN PATENT DOCUMENTS

| | | |
|---|---|---|
| JP | 57-094482 | 6/1982 |
| JP | 62-003280 | 1/1987 |
| JP | 07-057066 | 3/1995 |
| JP | 07-239960 | 9/1995 |
| JP | 08-220317 | 8/1996 |
| JP | 09-054850 | 2/1997 |
| JP | 2000-042764 | 2/2000 |
| JP | 2001-307015 | 11/2001 |
| JP | 2003-001448 | 1/2003 |
| JP | 2003-215319 | 7/2003 |
| JP | 2004-209542 | 7/2004 |
| JP | 2007-516840 | 6/2007 |
| JP | 2008-012546 | 1/2008 |
| JP | 2010-207879 | 9/2010 |
| KR | 10-2002-0021131 | 3/2002 |
| KR | 10-2006-0017002 | 2/2006 |
| KR | 10-2006-0126799 | 12/2006 |
| KR | 10-2010-0013623 | 2/2010 |
| KR | 10-1053978 | 8/2011 |
| KR | 10-2012-0037546 | 4/2012 |
| KR | 10-2012-0050521 | 5/2012 |
| KR | 10-2012-0120670 | 11/2012 |

OTHER PUBLICATIONS http://www.opto-engineering.com/resources/telecentric-lenses-tutorial.*
English Translations of KR 10-2010-0013623, JP 2010-207879, JP H09-54850, JP 2001-307015, JP 2000-042764, KR 10-2012-0120670.*

* cited by examiner

APPARATUS AND METHOD OF PROCESSING ANTI-COUNTERFEITING PATTERN, AND APPARATUS AND METHOD OF DETECTING ANTI-COUNTERFEITING PATTERN

BACKGROUND OF THE INVENTION (a) Field of the Invention

The present invention relates to an apparatus for processing an anti-counterfeiting pattern and a method thereof, and an apparatus for detecting an anti-counterfeiting pattern and a method thereof. More particularly, the present invention relates to an apparatus for processing an anti-counterfeiting pattern by using a laser processing system and a method thereof, and an apparatus for detecting an anti-counterfeiting pattern and a method thereof.

(b) Description of the Related Art

Recently, a financial supervisory authority has determined that forgery and tampering incidents have reached a dangerous level such as through appearance of counterfeit 100,000 won checks that are so elaborately forged that it is difficult to easily discern authenticity thereof, and is reviewing various methods such as a check usage procedure improvement and a check design and material change to prevent the illegal forgery and tampering of the checks.

In a check anti-counterfeiting field, a technique such as protruding silver, a Sharon silver, a dichroic fluorescent ink, and the like is applied, however it is generally observed whether a counterfeit is generated by irradiating ultraviolet rays or a bright light. Because the counterfeiting is judged by eyes, an error depending on a discriminator individual may be generated.

Accordingly, introduction of a processing technique of the anti-counterfeiting pattern by more rapidly processing an anti-counterfeiting pattern with a lower cost to be applied to an object such as the check and a detecting technique of the anti-counterfeiting pattern rapidly detecting the anti-counterfeiting pattern with the lower cost is required.

Also, in various fields such as luxury goods, jewellery, old documents, confidential documents, and passports, an anti-counterfeiting technique is required.

SUMMARY OF THE INVENTION

One aspect of the present invention provides an apparatus and a method for processing the anti-counterfeiting pattern by using a laser processing system to form a fine pattern of a nanometer or micrometer scale.

Another aspect of the present invention provides an apparatus and a method for detecting the anti-counterfeiting pattern of the micrometer or nanometer scale by using a laser measuring system.

According to a first aspect of the present invention, an anti-counterfeiting pattern processing apparatus including: a laser oscillator emitting a laser beam; a diffractive optical element incident with the laser beam to be diffracted to be divided into a plurality of diffraction lights; a rotating driver rotating the diffractive optical element; a first lens condensing the branched diffraction lights to induce a plurality of diffraction lights parallel to each other; a second lens refracting the plurality of diffraction lights parallel to each other to be irradiated to a processed target; and a first stage supporting the processed target and configured to be movable is provided.

The diffractive optical element is configured to branch the two laser beam primary diffraction lights separated from each other in a diameter direction and is formed of a circular plate shape having a circular periphery, and the rotating driver includes a pulley provided at one side of the diffractive optical element and a driving belt connecting the periphery of the diffractive optical element and the pulley together such that the diffractive optical element is rotated by a predetermined angle as the pulley is rotated.

Also, according to a second aspect of the present invention, a method for processing an anti-counterfeiting pattern including: emitting a laser beam from the laser oscillator; passing the emitted laser beam through the diffractive optical element to be branched into a plurality of diffraction lights; passing the branched diffraction lights through the lens to be irradiated to the processed target to process a first pattern; rotating the diffractive optical element by a predetermined angle; and moving the processed target by a predetermined distance, and then sequentially passing the laser beam through the diffractive optical element and the lens to be irradiated to the processed target to form a second pattern is provided.

The groove direction of the first pattern and the groove direction of the second pattern may be processed to have different angles.

According to a third aspect of the present invention, an apparatus for processing an anti-counterfeiting pattern includes: a laser oscillator emitting a laser beam; a beam mask positioned on a path where the laser beam passes and having a plurality of openings to branch the laser beam into a plurality of processing beams; a bi-prism positioned on a path where the laser beam passes; a rotating driver rotating the bi-prism; and a first stage supporting a processed target to simultaneously irradiate a plurality of processing beams and configured to be movable is provided.

The bi-prism may have a reference surface facing the beam mask, and a first inclination surface and a second inclination surface inclined in different directions with respect to the reference surface, and the rotating driver may include a circular plate attached to the reference surface and having a circular periphery, a pulley provided at one side of the bi-prism, and a driving belt connecting the circular plate and the pulley together to rotate the bi-prism by the predetermined angle as the pulley is rotated.

The opening may be made of a circular or polygonal shape and is positioned within a boundary formed by a width of the laser beam.

According to a fourth aspect of the present invention, a method for processing an anti-counterfeiting pattern includes: emitting a laser beam from the laser oscillator; passing the emitted laser beam through a beam mask to be branched into a plurality of processing beams; condensing and interfering the processing beams with each other to be irradiated to the processed target through the bi-prism, thereby processing a first pattern; rotating the bi-prism by a predetermined angle; and moving the processed target by a predetermined distance, and then sequentially passing the laser beam through the beam mask and the bi-prism to interfere with each other to be condensed and irradiated to the processed target, thereby processing a second pattern.

The groove direction of the first pattern and the groove direction of the second pattern may be processed to have different angles.

According to a fifth aspect of the present invention, an apparatus for processing an anti-counterfeiting pattern including: a diffractive optical element branching the laser beam generated from the laser oscillator into a plurality of processing beams; a rotating driver rotating the diffractive optical element; and a pair of reflection mirrors respectively reflecting the processing beams to be irradiated together to the processed target to process the processed target is provided.

A beam reducer installed between the laser oscillator and the diffractive optical element and controlling a diameter of the laser beam may be further included.

The diffractive optical element may generate the processing beam of which the laser beam is branched into two primary diffraction lights separated from each other in a diameter direction.

According to a sixth aspect of the present invention, an apparatus for processing an anti-counterfeiting pattern including: a laser oscillator emitting a laser beam; a first beam splitter branching the laser beam generated from the laser oscillator into a plurality of processing beams; and a pair of reflection mirrors respectively reflecting the processing beams to be irradiated together to the processed target, thereby processing the processed target, is provided.

According to a seventh aspect of the present invention, an apparatus for detecting an anti-counterfeiting pattern, wherein the anti-counterfeiting pattern formed on an object includes a plurality of fine pattern parts having directionality and the anti-counterfeiting pattern is detected from the object when the fine pattern part includes a plurality of minute protrusions and depressions extending in the same direction, including: a laser oscillator emitting a laser beam; a fourth lens condensing the laser beam to be irradiated to the anti-counterfeiting pattern made of the fine pattern part having directionality; a camcorder photographing a recognition pattern that is reflected from the anti-counterfeiting pattern to be diffracted; and a detector analyzing the photographed recognition pattern to detect an identification symbol is provided.

The detector may include: an image conversion unit converting the image of the photographed recognition pattern to calculate a light spot alignment angle; an error checking unit connected to the image conversion unit and determining whether the calculated light spot alignment angle is within an error range with respect to predetermined processing rotation accuracy; and an identification symbol calculating unit connected to the error checking unit and calculating an identification symbol corresponding to the measured light spot alignment angle according to a corresponding standard of a predetermined identification symbol.

The image conversion unit may detect a reference pattern part included in the anti-counterfeiting pattern to provide a measuring reference line of the light spot alignment angle.

According to an eighth aspect of the present invention, an apparatus for detecting an anti-counterfeiting pattern, wherein the anti-counterfeiting pattern formed on an object includes a plurality of fine pattern parts having directionality and the anti-counterfeiting pattern is detected from the object when the fine pattern part includes a plurality of minute protrusions and depressions extending in the same direction, including: a laser oscillator emitting a laser beam; a second beam splitter positioned on a path where the laser beam passes; a camcorder photographing a recognition pattern diffracted while the laser beam passing through the second beam splitter is reflected by the anti-counterfeiting pattern; and a detector analyzing the photographed recognition pattern to detect an identification symbol is provided, wherein the recognition pattern diffracted while being reflected from the anti-counterfeiting pattern may be reflected from the second beam splitter and is transmitted to the camcorder through a fifth lens.

The anti-counterfeiting pattern may be disposed for the laser beam passing through the second beam splitter to be perpendicularly incident with respect to the anti-counterfeiting pattern, and the laser oscillator includes a plurality of laser oscillating units respectively corresponding to the fine pattern part.

A beam divider positioned between the laser oscillator and the second beam splitter may be further included, wherein the beam divider may divide the laser beam to respectively correspond to the fine pattern part.

The beam divider may be positioned on a path where the laser beam is emitted on the laser oscillator, and includes at least one beam distribution unit and one reflection mirror positioned on one line.

The laser beam may be divided into a first laser beam passing through the beam distribution unit and a second laser beam reflected from the beam distribution unit, the first laser beam may progress in the reflection mirror direction, and the second laser beam may progress in the second beam splitter direction.

The first laser beam may be reflected from the reflection mirror and then progress in the second beam splitter direction.

Shields respectively positioned between the second beam splitter and the beam distribution unit, between the second beam splitter and the beam distribution unit may be further included.

One among the fine pattern part may be incident by the laser beam reflected from the reflection mirror, and the rest among the fine pattern part may be incident by the laser beam reflected from the second beam splitter.

When one among the shields is in an opened state, the rest of the shields may be in a closed state.

According to the anti-counterfeiting pattern processing apparatus, the anti-counterfeiting pattern may be further quickly processed with a low cost.

Also, the fine pattern part having the plurality of minute protrusions and depressions parallel in one direction may be processed in plural to form the anti-counterfeiting pattern. According to the anti-counterfeiting pattern processing method of the present invention, the plurality of fine pattern parts may be easily processed to have the groove directions with the different angles. For example, when forming the fine pattern part of the vertical direction, the fine pattern part of the horizontal direction, and the fine pattern part of the oblique direction, they may be quickly and sequentially processed through the rotation control of the diffractive optical element, the polarization element, or the bi-prism.

Also, in the present invention, after the laser beam is branched and before being irradiated to the processed target, the laser beam does not pass through a condenser lens such that an air breakdown phenomenon is not generated due to the condenser lens.

Further, according to the anti-counterfeiting pattern detecting apparatus, the anti-counterfeiting pattern may be further quickly processed with a low cost.

BRIEF DESCRIPTION OF THE DRAWINGS

FIG. 1 is a view showing a first diffraction pattern state and FIG. 2 is a view showing a second diffraction pattern state.

FIG. 7 shows a first polarization pattern state and FIG. 8 shows a second polarization pattern state.

FIG. 17 shows a first pattern state and FIG. 18 shows a second pattern state.

FIG. 24 is a view showing a state of sensing a first fine pattern part, FIG. 25 is a view showing a state of sensing a second fine pattern part, and FIG. 26 is a view showing a state of sensing a third fine pattern part.

FIG. 33 is a view showing a state of sensing a first fine pattern part, FIG. 34 is a view to explain a beam incident to a fine pattern, FIG. 35 is a view showing a state of sensing a second fine pattern part, and FIG. 36 is a view showing a state of sensing a third fine pattern part.

Figure 1:
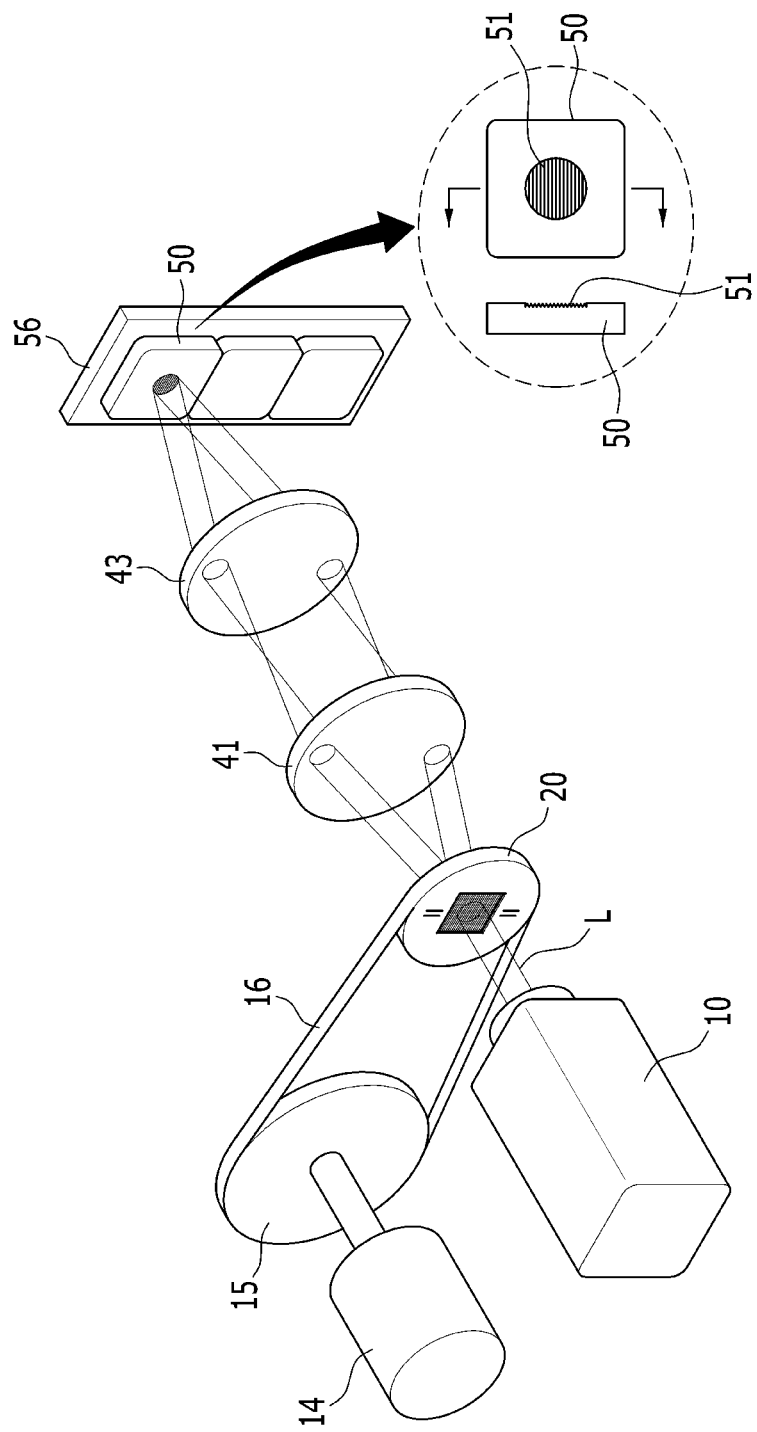
FIG. 1 and FIG. 2 are diagrams showing an anti-counterfeiting pattern processing apparatus including a diffractive optical element according to a first exemplary embodiment of the present invention, where

| <Reference numerals> | |
|---|---|
| 10: laser oscillator | 11, 12, 13: first, second, third laser oscillating unit |
| 14: motor | 15: pulley |
| 16: driving belt | 18: driving rotation gear |
| 20, 20': diffractive optical element | 21: beam mask |
| 25: shutter | 30: polarization element |
| 31: bi-prism | 32: pattern processing unit |
| 41: first lens | 43: second lens |
| 44: diffraction light selector | 45: third lens |
| 46: fourth lens | 48: fifth lens |
| 49: beam reducer | 50: processed target |
| 51: anti-counterfeiting pattern | 52: object |
| 54: alignment mark | 56: first stage |
| 57: second stage | 60: camcorder |
| 70: detector | 72: image conversion unit |
| 74: error checking unit | 76: identification symbol calculating unit |
| 78: display unit | 80: first beam splitter |

-continued

<Reference numerals>

| | |
|---|---|
| 81: second beam splitter | 81a, 81b, 81c: first, second, third shield |
| 85, 87: beam distribution unit | 89: reflection mirror |
| 90: terminal main body | 92: CCD camera |
| 94: display part | 321, 322 reflection mirror |
| 491: convex lens | 492: concave lens |
| 900: moving terminal | |
| D: dead zone | NF1, NF2: ND filter |
| L: laser beam | |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In addition, throughout the specification, "on" implies being positioned above or below a target element, and does not imply being necessarily positioned on the top on the basis of a gravity direction.

Figure 2:
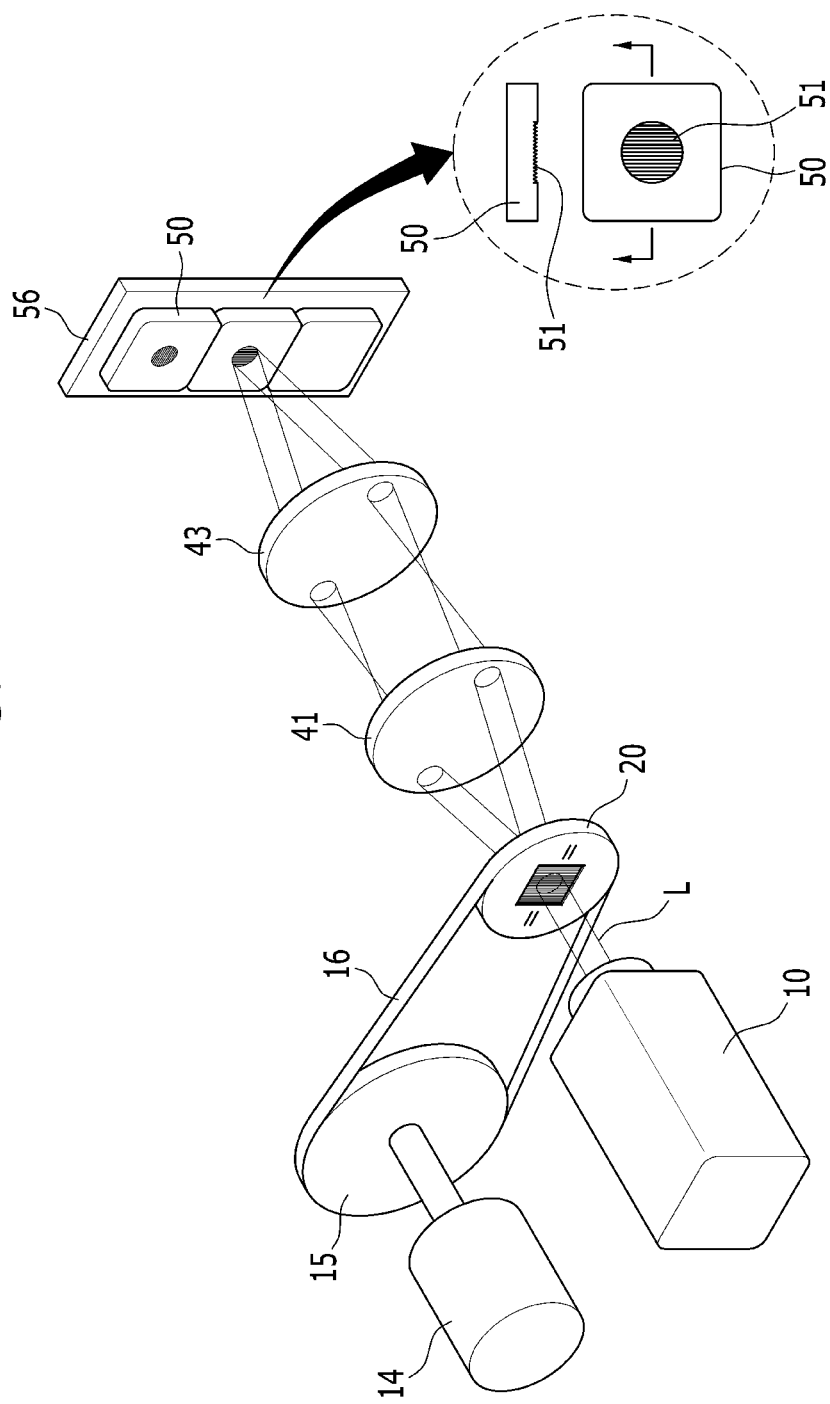

FIG. 1 and FIG. 2 are diagrams showing an anti-counterfeiting pattern processing apparatus including a diffractive optical element according to a first exemplary embodiment of the present invention, where FIG. 1 is a view showing a first diffraction pattern state and FIG. 2 is a view showing a second diffraction pattern state.

Referring to FIG. 1, an anti-counterfeiting pattern processing apparatus according to the present exemplary embodiment includes a laser oscillator 10, a diffractive optical element (DOE) 20, and lenses 41 and 43. The laser oscillator 10 emits a laser beam L, and the emitted laser beam L is branched into a plurality of diffraction lights while being incident to the diffractive optical element 20 to be diffracted. The plurality of diffraction lights are condensed while passing through the lenses 41 and 43 to be irradiated to a processed target 50, thereby forming a fine pattern in the processed target 50 by the irradiated diffraction light.

In the present exemplary embodiment, the diffractive optical element 20 is formed with a line pattern so as to branch the laser beam L into two primary diffraction lights separated from each other in a diameter direction. The diffraction light includes a 0-order diffraction light progressing in the incident beam direction as well as the primary diffraction light, and high order diffraction lights such as secondary and tertiary lights also exist. The diffractive optical element 20 may be designed to be applied such that a laser power of the 0-order diffraction light and the high order diffraction light becomes a minimum (less than about 5%) and the laser power of the primary diffraction light becomes a maximum (more than about 95%).

The diffractive optical element 20 may be rotated with reference to an axis parallel to the direction in which the laser beam L is incident, and for this, the diffractive optical element 20 is configured with a circular plate shape having a circular perimeter, and a rotating driver capable of rotating the diffractive optical element 20 may be provided. The rotating driver includes a pulley 15 provided at one side of the diffractive optical element 20, and a driving belt 16 connecting the perimeter of the diffractive optical element 20 and the pulley 15 together. The pulley 15 is rotated by driving a motor 14 connected thereto, and the driving belt 16 may be configured to rotate the diffractive optical element 20 by a predetermined angle as the pulley 15 is rotated.

Referring to FIG. 2, in the state in which the diffractive optical element 20 is rotated by 90 degrees by the rotating driver, the laser beam L may be shown to be branched into two primary diffraction lights. That is, in FIG. 1, two primary diffraction lights are branched to be separated from each other in the vertical diameter direction, and in contrast, in FIG. 2, two primary diffraction lights are branched to be separated from each other in the horizontal diameter direction. Accordingly, a groove direction of the fine pattern 51 formed on the processed target 50 may be formed while having an angle difference of 90 degrees corresponding to the rotation of the diffractive optical element 20.

In the present exemplary embodiment, the lenses 41 and 43 may include a first lens 41 and a second lens 43, where the first lens 41 may have a function of condensing the branched diffraction lights to be induced as a plurality of diffraction lights parallel to each other, and the second lens 43 refracts the plurality of diffraction lights parallel to each other to be irradiated to the processed target 50. As an example of the first lens 41, a telecentric lens or an F-theta lens may be applied, and a condensing lens may be applied as an example of the second lens 43.

The anti-counterfeiting pattern processing apparatus according to the present exemplary embodiment includes a first stage 56 to support the processed target 50, and the first stage 56 may be moved to move the position of the processed target 50. The processed target 50 may be made of a thin film metal or a polymer. For example, an aluminum thin plate may be coated on a paper and a fine pattern part having the different groove directions may be processed on the surface thereof, and the fine pattern parts having the different directions may be processed on the polymer material surface or inside the polymer material.

Figure 3:
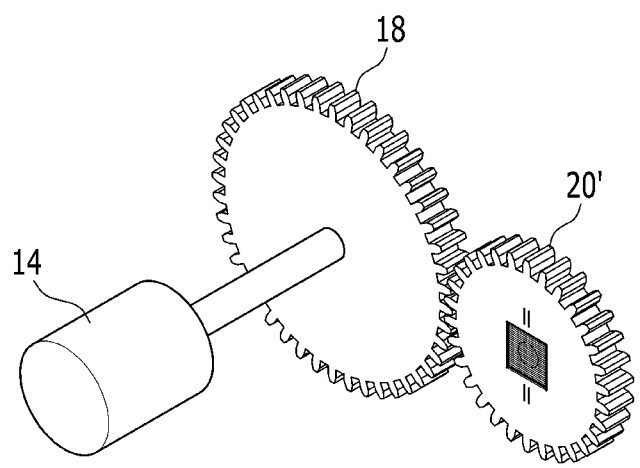
FIG. 3 is a perspective view showing an exemplary variation of a rotating driver in an anti-counterfeiting pattern processing apparatus including a diffractive optical element according to the first exemplary embodiment of the present invention.

FIG. 3 is a perspective view showing an exemplary variation of a rotating driver in an anti-counterfeiting pattern processing apparatus including a diffractive optical element according to the first exemplary embodiment of the present invention.

Referring to FIG. 3, in a diffractive optical element 20' of the present exemplary variation, teeth are formed on the circumference thereof, and a driving rotation gear 18 is provided to be coupled to the circumference teeth of the diffractive optical element 20' such that the diffractive optical element 20' may be rotated by the predetermined angle. The driving rotation gear 18 may be connected with the motor 14 to provide the driving power.

Figure 4:
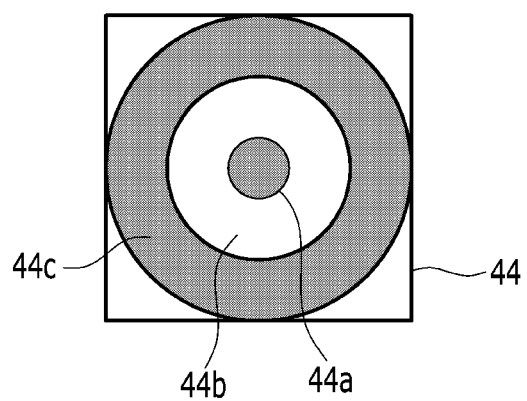
FIG. 4 is a front view showing a diffraction light selector applied to an anti-counterfeiting pattern processing apparatus according to the first exemplary embodiment of the present invention.

FIG. 4 is a front view showing a diffraction light selector applied to an anti-counterfeiting pattern processing apparatus according to the first exemplary embodiment of the present invention.

As described above, as the primary diffraction light has laser power of more than 95% according to the pattern design of the diffractive optical element 20, two branched diffraction lights form interference to form the fine pattern in the processed target 50. Furthermore, as a diffraction light selector 44 as shown in FIG. 4 is positioned in the path of the diffraction light, diffraction light of a desired order may be selectively obtained. In the present exemplary embodiment, in the diffraction light selector 44, a 0-order diffraction light blocking part 44a may be formed on the center of the transparent glass plate, a primary diffraction light transmission part 44b may be formed to enclose the 0-order diffraction light blocking part 44a, and a high order diffraction light blocking part 44c may be formed to enclose the primary diffraction light transmission part 44b. The 0-order diffraction light blocking part 44a and the high order diffraction light blocking part 44c consist of a dark color, thereby shielding the diffraction light.

In the present exemplary embodiment, the diffraction light selector 44 may be positioned at one position between the diffractive optical element 20 and the first lens 41, between the first lens 41 and the second lens 43, or between the second lens 43 and the processed target 50.

Figure 5:
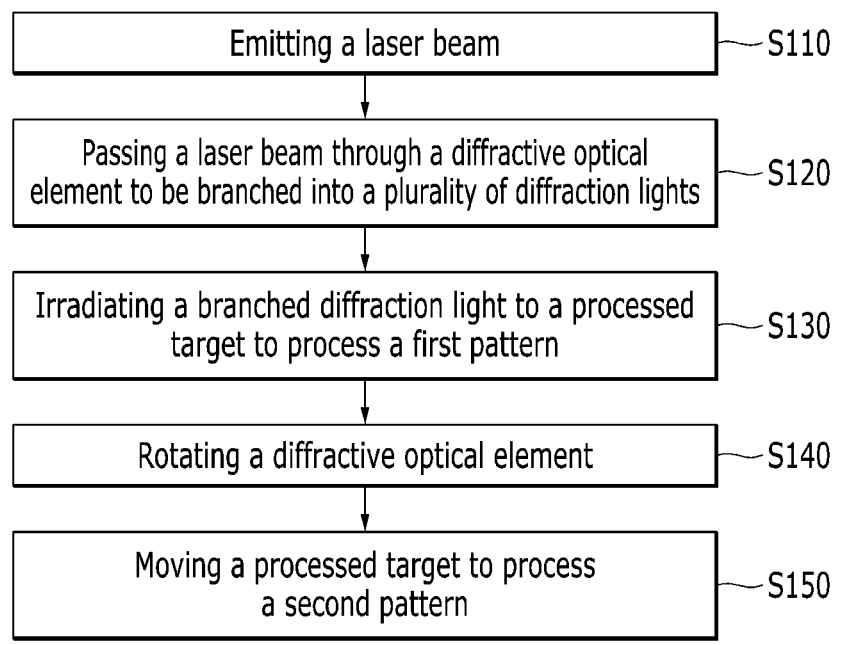
FIG. 5 is a flowchart showing an anti-counterfeiting pattern processing method according to a second exemplary embodiment of the present invention.
Figure 6:
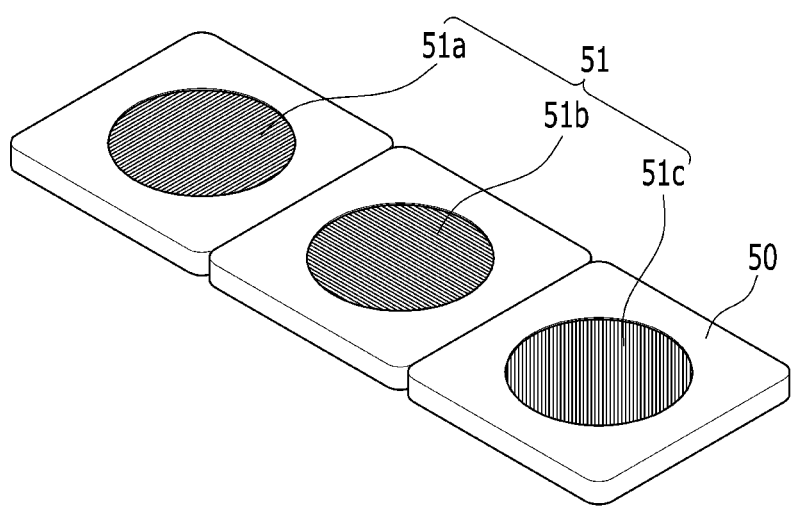
FIG. 6 is a perspective view showing an anti-counterfeiting pattern processed by an anti-counterfeiting pattern processing method according to the second exemplary embodiment of the present invention.

FIG. 5 is a flowchart showing an anti-counterfeiting pattern processing method according to a second exemplary embodiment of the present invention, and FIG. 6 is a perspective view showing an anti-counterfeiting pattern processed by an anti-counterfeiting pattern processing method according to the second exemplary embodiment of the present invention.

The anti-counterfeiting pattern processing method according to the second exemplary embodiment of the present invention using the anti-counterfeiting pattern processing apparatus including the diffractive optical element will be described with reference to FIG. 5. Hereinafter, when describing a different exemplary embodiment from the first exemplary embodiment, the detailed description of the overlapped configurations with the first exemplary embodiment is omitted.

First, the laser beam L is emitted from the laser oscillator 10 (S110). The laser beam L may be formed by selecting and using a laser having power and a wavelength that are appropriate for the pattern processing, and may be changed depending on a material of the processed target.

Next, the emitted laser beam L passes through the diffractive optical element 20 to be branched into a plurality of diffraction lights (S120). For example, by allowing the primary diffraction light to have the laser power of 95% or more, two branched diffraction lights may be formed, and the diffraction light selector shown in FIG. 3 may be used.

Next, the branched diffraction lights pass through the lens to be irradiated to the processed target 50, thereby processing the first pattern (S130). That is, as the branched diffraction lights are irradiated together to the processed target 50 to interfere with each other, the fine pattern part formed with the minute protrusions and depressions parallel in one direction may be formed on the processed target 50. After completing the processing of the first pattern, the laser beam L is blocked to not be irradiated to the processed target 50 and may be irradiated again when the processing of the second pattern starts.

Next, the diffractive optical element 20 is rotated by the predetermined angle (S140). That is, by controlling the rotating driver connected to the diffractive optical element 20, the diffractive optical element 20 may be rotated by the predetermined rotation angle and may be fixed.

Next, after the processed target 50 is moved by a predetermined distance, the laser beam L sequentially passes through the diffractive optical element 20 and the lenses 41 and 43 to be irradiated to the processed target 50, thereby processing the second pattern (S150). That is, to process the second pattern having the different groove direction after processing the first pattern, the first stage 56 supporting the processed target 50 may be moved to change the position to irradiate the laser beam L. Next, as shown in FIG. 2, the diffractive optical element 20, for example, may be rotated by 90 degrees to generate the new diffraction pattern, and accordingly, the second pattern having the groove direction of the vertical direction may be formed directly next to the first pattern having the groove direction of the horizontal direction.

By repeating these steps, the first pattern, the second pattern, the third pattern, and the like having sequentially different groove directions may be processed on the processed target 50, thereby forming the anti-counterfeiting pattern on the processed target 50. For example, referring to FIG. 6, by processing the first pattern 51a, the second pattern 51b, and the third pattern 51c having the different groove directions, the anti-counterfeiting pattern 51 made of combinations thereof may be generated.

Figure 7:
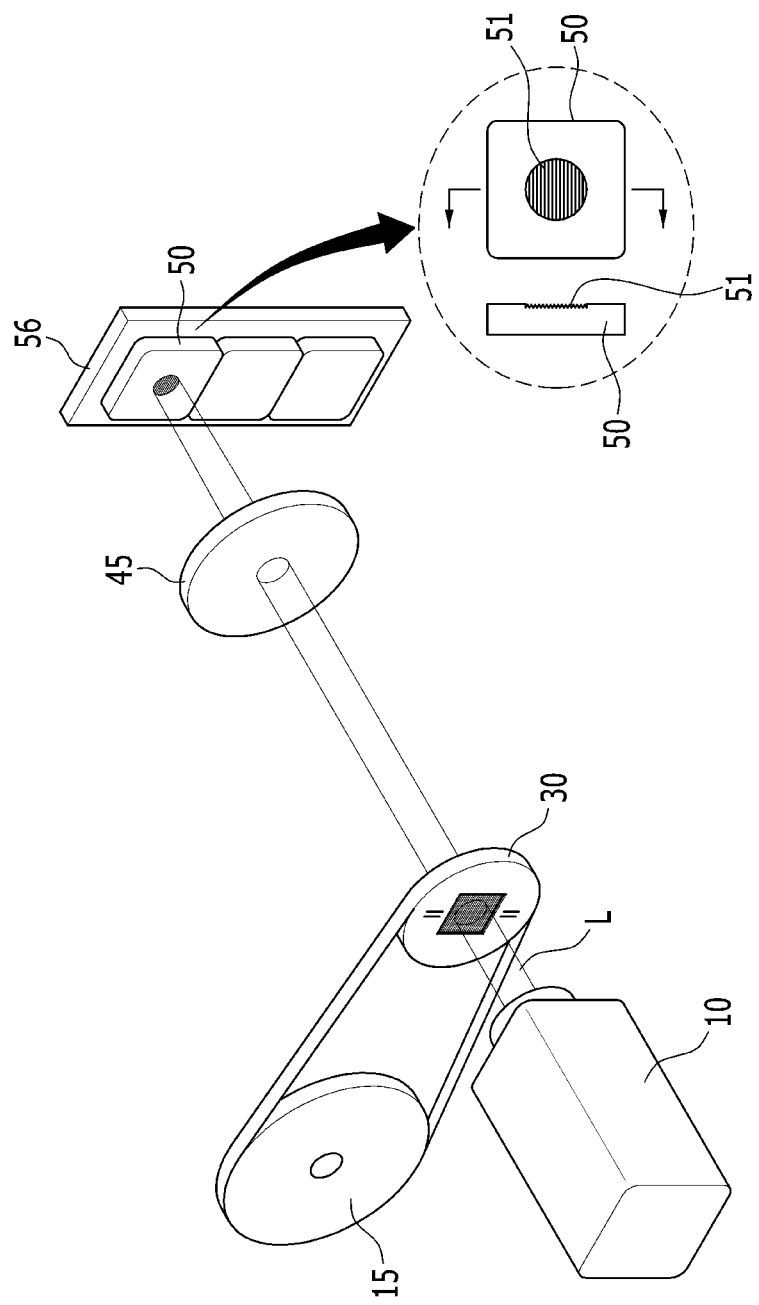
FIG. 7 and FIG. 8 are diagrams showing an anti-counterfeiting pattern processing apparatus including a polarization element according to a third exemplary embodiment of the present invention, where
Figure 8:
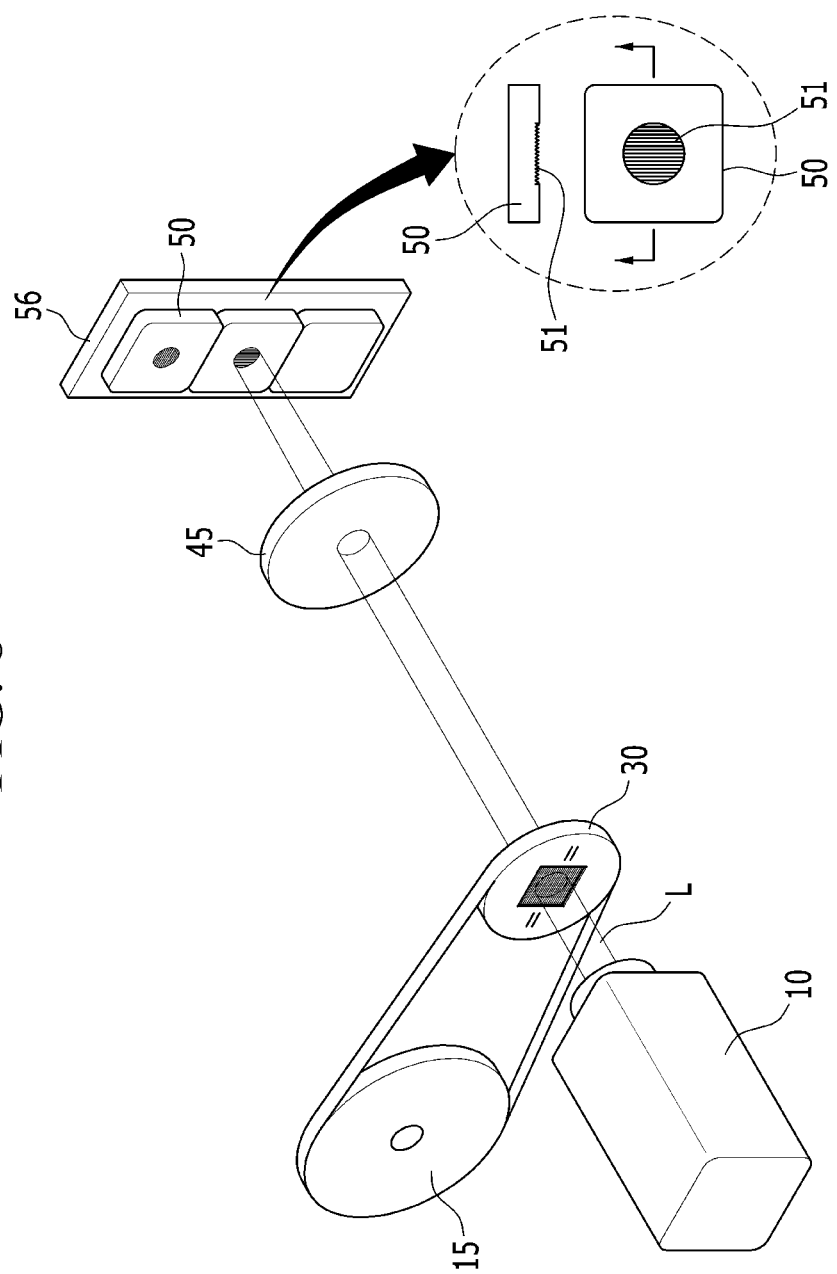

FIG. 7 and FIG. 8 are diagrams showing an anti-counterfeiting pattern processing apparatus including a polarization element according to a third exemplary embodiment of the present invention, where FIG. 7 shows a first polarization pattern state and FIG. 8 shows a second polarization pattern state.

Referring to FIG. 7, the anti-counterfeiting pattern processing apparatus having the polarization element according to the third exemplary embodiment of the present invention includes the laser oscillator 10, the polarization element 30, and a lens 45. The laser oscillator 10 emits the laser beam L, and the emitted laser beam L is incident to the polarization element 30 to be polarized such that a polarized laser beam is emitted. The polarized laser beam is condensed while passing through the lens 45 and irradiated to the processed target 50, and the fine pattern may be formed in the processed target 50 by the thus-irradiated polarized laser beam.

The polarization element 30 may be rotated with respect to the axis parallel to the incident direction of the laser beam L, and for this, the polarization element 30 is configured with the circular plate shape having the circular perimeter, and the rotating driver capable of rotating the polarization element 30 may be provided. The rotating driver includes the pulley 15 provided at one side of the polarization element 30 and the driving belt connecting the perimeter of the polarization element 30 and the pulley 15 together. The driving belt may be configured to rotate the polarization element 30 by the predetermined angle as the pulley 15 is rotated. In the processing apparatus according to the present exemplary embodiment, as shown in FIG. 3, as the teeth are also formed on the circumference of the polarization element and the driving rotation gear is provided to be coupled with the circumference of the polarization element, the polarization element may be rotated by the predetermined angle.

In the present exemplary embodiment, the polarization element 30 may include a half wavelength plate. If the half wavelength plate is rotated by the angle Θ, the polarization is rotated by the angle 2Θ. Accordingly, the rotated fine pattern may be processed by using the rotated polarization.

Referring to FIG. 8, in the state that the polarization element 30 is rotated 90 degrees by the rotating driver, the laser beam L is polarized and emitted. Accordingly, the groove direction of the fine pattern 51 formed in the processed target 50 may be formed while having the angle difference of 90 degrees corresponding to the rotation angle of the polarization element 30.

In the present exemplary embodiment, the lens 45 as the third lens 45 has a function of condensing and irradiating the polarized laser beam to the processed target 50, and for example, the condensing lens may be applied.

The anti-counterfeiting pattern processing apparatus according to the present exemplary embodiment includes the first stage 56 to support and move the processed target 50, such that the position of the processed target 50 may be moved. The processed target 50 may be made of the thin film metal or the polymer. For example, an aluminum thin plate may be coated on the paper and the fine pattern part having the different groove directions may be processed on the surface thereof, and fine pattern parts having the different directions may be processed on the polymer material surface or inside the polymer material.

Figure 9:
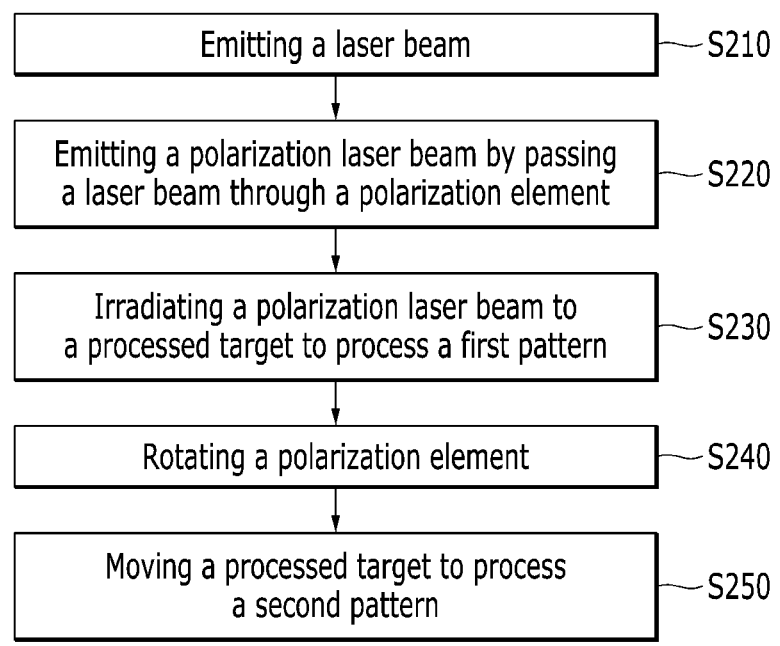
FIG. 9 is a flowchart showing an anti-counterfeiting pattern processing method according to a fourth exemplary embodiment of the present invention.

FIG. 9 is a flowchart showing an anti-counterfeiting pattern processing method according to a fourth exemplary embodiment of the present invention.

The anti-counterfeiting pattern processing method using the anti-counterfeiting pattern processing apparatus including the polarization element according to the fourth exemplary embodiment of the present invention will be described with reference to FIG. 9.

Firstly, the laser beam L is emitted from the laser oscillator 10 (S210). The laser beam L may be formed by selecting and using a laser having power and a wavelength that are appropriate for the pattern processing, and may be changed depending on a material of the processed target.

Next, the emitted laser beam L passes through the polarization element 30 to be emitted as a plurality of diffraction lights (S220).

Next, the polarized laser beam L passes through the lens to be irradiated to the processed target 50, thereby processing the first pattern (S230). The polarized laser beam is irradiated to the processed target 50 such that the fine pattern part formed with minute protrusions and depressions parallel to one direction may be formed on the processed target 50. After completing the processing of the first pattern, the laser beam L is blocked to not be irradiated to the processed target 50, and may be irradiated again when the processing of the second pattern starts.

Next, the polarization element 30 is rotated by the predetermined angle (S240). That is, by controlling the rotating driver connected to the polarization element 30, the polarization element 30 may be rotated by the predetermined rotation angle and may be fixed.

Next, after the processed target 50 is moved by the predetermined distance, the laser beam L sequentially passes through the polarization element 30 and the lens 43 to be irradiated to the processed target 50, thereby processing the second pattern (S250). That is, to process the second pattern having the different groove direction after processing the first pattern, the first stage 56 supporting the processed target 50 may be moved to change the position to irradiate the laser beam L. Next, as shown in FIG. 2, the polarization element 30, for example, may be rotated by 90 degrees to generate the new diffraction pattern, and accordingly, the second pattern having the groove direction of the vertical direction may be formed directly next to the first pattern having the groove direction of the horizontal direction.

Through these steps, the first pattern, the second pattern, the third pattern, and the like having the sequentially different groove directions may be processed on the processed target 50, thereby forming the anti-counterfeiting pattern on the processed target 50.

Figure 10:
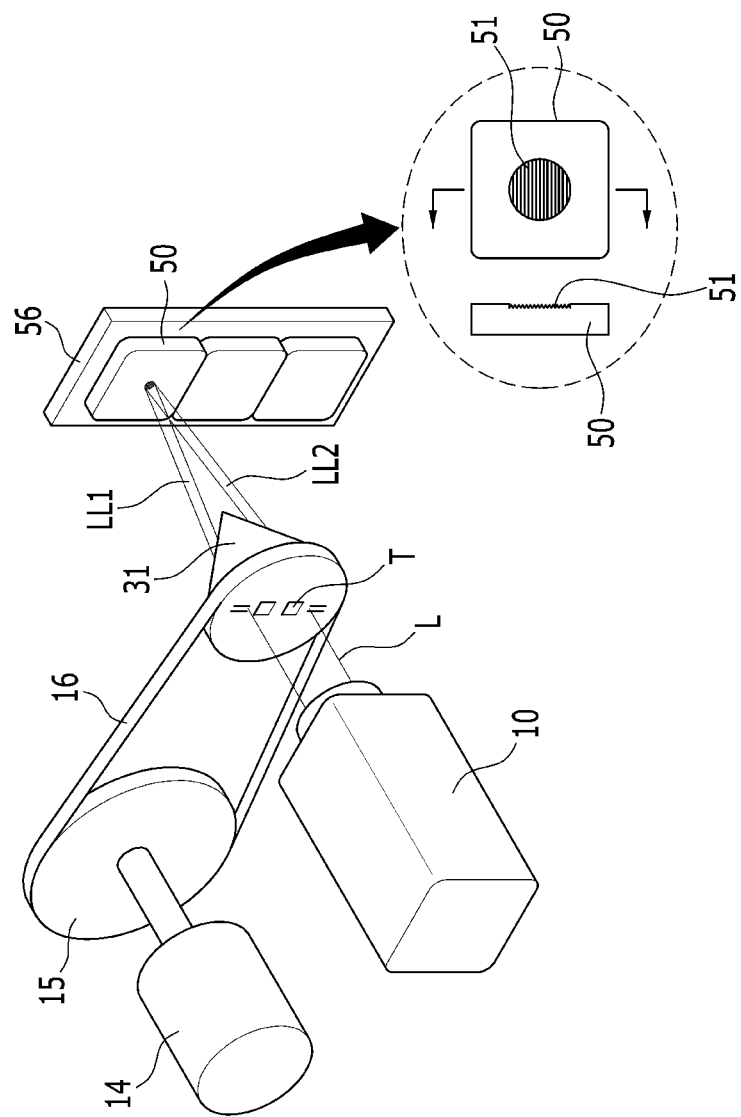
FIG. 10 is a schematic diagram of an anti-counterfeiting pattern processing apparatus according to a fifth exemplary embodiment of the present invention.
Figure 11:
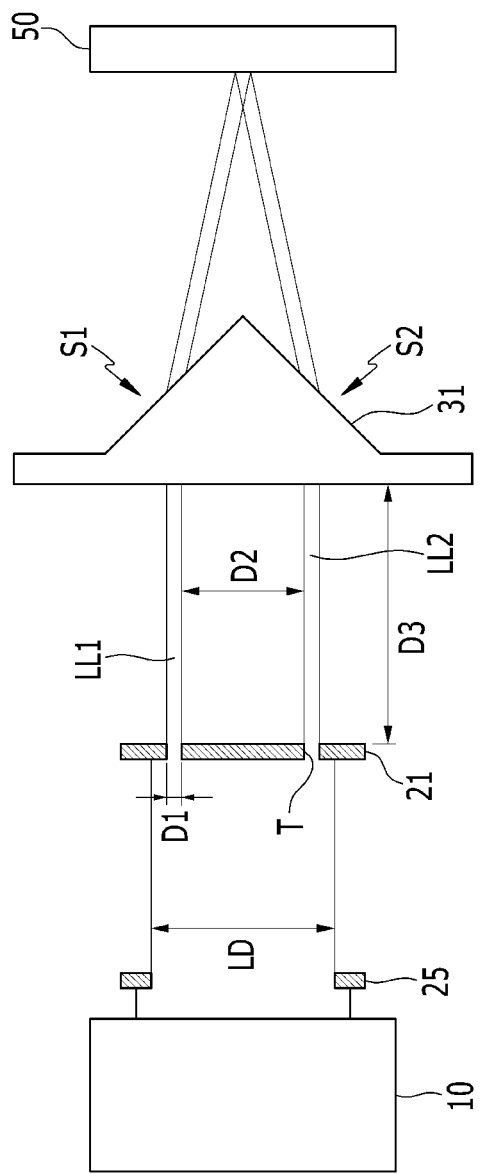
FIG. 11 is a schematic cross-sectional view of the anti-counterfeiting pattern processing apparatus of FIG. 10.
Figure 12:
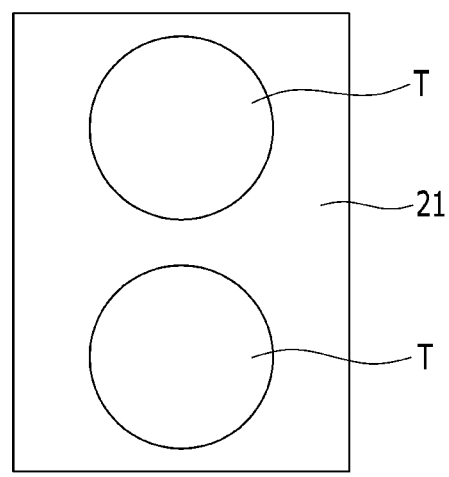
FIG. 12 and FIG. 13 are top plan views showing an opening shape of a beam mask according to an exemplary variation of FIG. 10.
Figure 13:
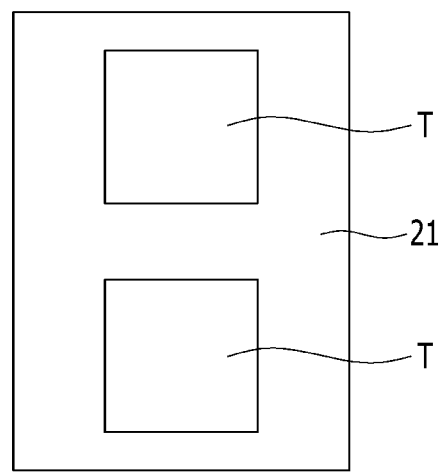
Figure 14:
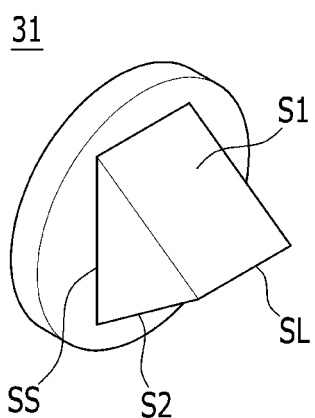
FIG. 14 is a perspective view showing an exemplary variation of a bi-prism of FIG. 10.

FIG. 10 is a schematic diagram of an anti-counterfeiting pattern processing apparatus according to a fifth exemplary embodiment of the present invention, FIG. 11 is a schematic cross-sectional view of the anti-counterfeiting pattern processing apparatus of FIG. 10, FIG. 12 and FIG. 13 are top plan views showing an opening shape of a beam mask according to an exemplary variation, and FIG. 14 is a perspective view showing an exemplary variation of a bi-prism.

The anti-counterfeiting pattern processing apparatus according to the fifth exemplary embodiment of the present invention includes, as shown in FIG. 10 and FIG. 11, a laser oscillator 10, a beam mask 21, and a bi-prism 31.

The laser oscillator 10 emits the laser beam L, and the emitted laser beam L is branched into a plurality of processing beams LL1 and LL2 through the beam mask 21. The plurality of processing beams are irradiated together to the processed target 50 after passing through the bi-prism 31, and the fine pattern 51 may be formed on the processed target 50 by the irradiated processing beam.

The laser oscillator 10 generates the laser beam L. The laser beam L may be used by selecting a laser having power and a wavelength that are appropriate for the pattern processing, and may be changed depending on the material of the processed target.

The laser oscillator 10 generates a laser beam of a flat top shape or a laser beam of a Gaussian shape, and the generated laser beam is incident to the beam mask 21. After cutting the edge of the laser beam of the Gaussian shape, the laser beam with the similar shape to the flat top may be incident to the beam mask 21.

The beam mask 21 to branch the laser beam L into the plurality of processing beams has a plurality of openings T. As shown in FIG. 12 and FIG. 13, the opening T may be a polygon such as circular or quadrangle, and it is preferable that a diameter of the circular opening or a length D1 of one side of the quadrangle opening is more than 0 mm to less than (a beam width)*½. Also, it is preferable that a distance D2 between the openings is greater than 0 to divide the beam. That is, the plurality of openings are positioned on the path passing the laser beam L, and the openings T are positioned within the boundaries formed by the beam width of the laser beam L.

A shutter 25 may be positioned between the laser oscillator 10 and the beam mask 21. The edge of the laser beam may be cut by the shutter. For example, when the width of the laser beam is 16 mm, the width may be reduced to 12.77 mm after the laser beam passes through the shutter.

The distance D3 between the shutter 25 and the beam mask 21 may be from 500 mm to 600 mm.

The bi-prism 31 is positioned on the path passing the laser beam and at a predetermined distance from the beam mask 21. The distance D4 between the bi-prism 31 and the beam mask 21 may be 20 mm or less. The distance between the bi-prism 31 and the beam mask 21 is preferable small, however the diffraction phenomenon is generated in the beam mask 21 such that the pattern formed on the processed target may be affected by the diffraction pattern. Accordingly, to eliminate this phenomenon, it is preferable that the predetermined distance between the bi-prism and the beam mask is maintained.

The bi-prism 31 to change the path of the laser beam incident to the bi-prism 31 allows the branched processing beams LL1 and LL2 to be simultaneously irradiated by the beam mask 21.

Referring to FIG. 14, the bi-prism 31 has a reference surface SS corresponding to the beam mask 21, and a first inclination surface S1 and a second inclination surface S2 inclined in different directions with respect to the reference surface SS. The angle of the processing beam irradiated to the processed target is changed depending on the inclination angle of the first inclination surface S1 and the second inclination surface S2 with respect to the reference surface SS, thereby the shape of the formed fine pattern is changed. Accordingly, the slope of the inclination surface may be controlled depending on the fine pattern to be formed, and for example, the slope may have an angle from 30 degrees to 94 degrees.

The angle may be determined depending on the distance between the processed target 50 and the refractive index of the bi-prism 31 so as to project the processing beams LL1 and LL2 incident to the bi-prism 31 to the processed target 50.

The first inclination surface S1 and the second inclination surface S2 are formed to be quadrangular, and the two inclination surfaces meet such that an edge SL parallel for the reference surface SS may be formed.

The branched processing beams LL1 and LL2 are refracted by the beam mask 21 while passing through the first inclination surface S1 and the second inclination surface S2, and are simultaneously incident to the processed target 50. The processing beams LL1 and LL2 are incident to the same region of the processed target 50, and the anti-counterfeiting pattern 51 made of the fine pattern is formed by the interference of the two processing beams LL1 and LL2. The fine pattern is formed to be circular or quadrangular as the opening, and may be a plurality of grooves parallel in one direction.

Again referring to FIG. 10 and FIG. 11, the processed target 50 is mounted on the first stage 56, and the position of the processed target 50 may be positioned where the processing beams LL1 and LL2 are irradiated. The processed target 50 may be made of the thin film metal, the polymer, leather, paper, etc. For example, an aluminum thin plate may be coated on paper and a fine pattern part having the different groove directions may be processed on the surface thereof, and the fine patterns having the different directions may be processed on the polymer material surface or inside the polymer material.

The bi-prism 31 may be rotated with respect to the axis parallel to the incident direction of the laser beam L. The bi-prism 31 may be connected to the circular plate having the circular periphery to rotate the bi-prism 31, and for this, the rotating driver may be provided. The reference surface SS1 may be one surface of the circular plate.

The rotating driver includes the pulley 15 provided at one side of the bi-prism 31, and the driving belt 16 connecting the periphery of the bi-prism 31 and the pulley 15 together. The pulley 15 may be rotated by driving the motor 14 connected thereto, and the driving belt 16 may be configured to rotate the bi-prism 31 by the predetermined angle as the pulley 15 is rotated.

In this case, the beam mask 21 may also be rotated by the same angle along with the bi-prism 31. The beam mask 21 may be rotated with the same method as the bi-prism 31, and for easy rotation, the circular periphery of the beam mask 21 may be connected to the pulley and the driving belt (not shown).

Meanwhile, the bi-prism 31 may be positioned on the circular plate of the above-described first exemplary embodiment, and the circular plate is formed with the teeth on the circumference, while the driving rotation gear is provided to be coupled to the circumference teeth such that the bi-prism 31 may be rotated by the predetermined angle.

In the above exemplary embodiment, the bi-prism 31 is attached to the circular plate, however it is not limited thereto, and the bi-prism 31 may be rotated by various methods. For example, after a recess portion having the same plane shape as the reference surface of the bi-prism 31 is formed on the circular plate, the bi-prism 31 may be inserted into the recess portion of the circular plate to be fixed, thereby rotating the bi-prism 31 along with the rotating driver.

Further, the teeth are also formed on the periphery of the beam mask 21 to be coupled with the driving rotation gear, thereby rotating by the same angle as the bi-prism 31.

The anti-counterfeiting pattern processing apparatus according to an exemplary embodiment of the present invention may rotate the bi-prism 31 by using the rotating driver. This will be described in detail with reference to FIG. 15.

Figure 15:
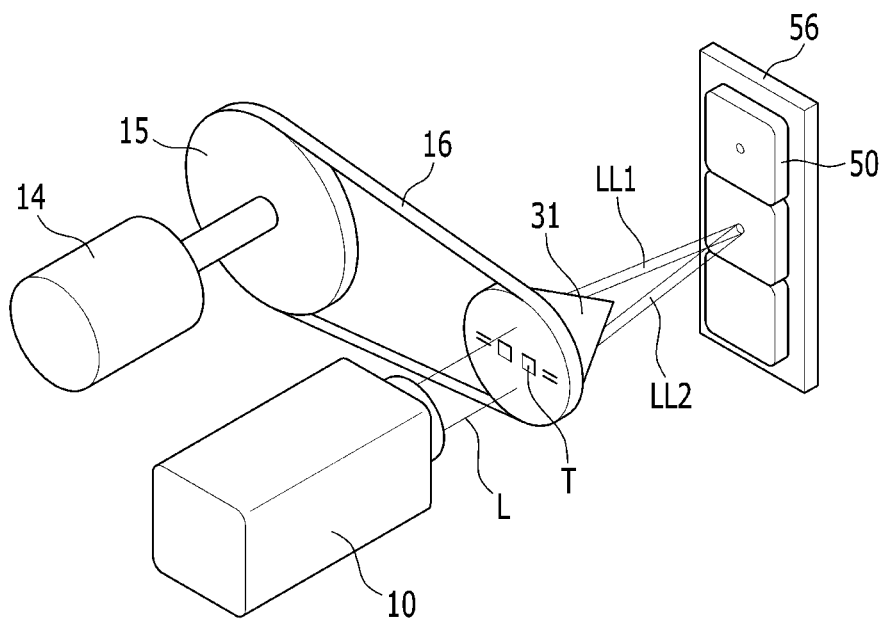
FIG. 15 is a schematic diagram showing a state in which the anti-counterfeiting pattern processing apparatus of FIG. 10 is rotated.

FIG. 15 is a schematic diagram showing a state in which the anti-counterfeiting pattern processing apparatus of FIG. 10 is rotated.

Referring to FIG. 15, it is shown that the laser beam L that is rotated by 90 degrees is branched into two processing beams LL1 and LL2 in the state that the bi-prism 31 is rotated by 90 degrees by the rotating driver. That is, in FIG. 10, the edge where two inclination surfaces meet is disposed in a Y-axis direction, however the edge where two inclination surfaces meet may be disposed in an X-axis direction in the rotation state of 90 degrees in FIG. 15.

Accordingly, the incident angles of the processing beams LL1 and LL2 incident to the processed target 50 after passing through the bi-prism 31 are different such that the groove direction of the fine pattern 51 formed in the processed target 50 may be formed while having the angle difference of 90 degrees corresponding to the rotation angle of the bi-prism 31.

The anti-counterfeiting pattern may be easily formed by using the anti-counterfeiting pattern processing apparatus according to the above-described present invention. This will be described with reference to FIG. 16 as well as FIG. 3 and FIG. 10 above.

Figure 16:
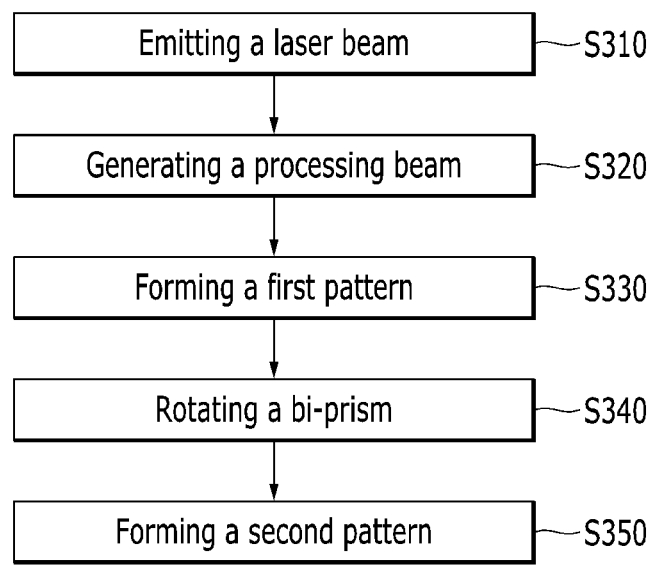
FIG. 16 is a flowchart to explain a method for processing an anti-counterfeiting pattern according to a sixth exemplary embodiment of the present invention.

FIG. 16 is a flowchart to explain a method for processing an anti-counterfeiting pattern according to a sixth exemplary embodiment of the present invention.

As shown in FIG. 16, the method for processing the anti-counterfeiting pattern according to the sixth exemplary embodiment of the present invention includes a step of emitting the laser beam (S310), a step of generating the processing beam (S320), a step of forming the first pattern (S320), a step of rotating the bi-prism (S340), and a step of forming the second pattern (S350).

In the step of emitting the laser beam (S310), the laser beam L is generated from the laser oscillator 10 and then the laser beam is emitted to the beam mask 21 (S310). The laser beam L may be used by selecting the laser having the power and the wavelength that are appropriate for the pattern processing, and may be changed depending on the material of the processed target.

In the step of generating the processing beam (S320), the processing beams LL1 and LL2 are generated while the laser beam L incident to the beam mask 21 is branched in plural by the beam mask (S320).

In the step forming the first pattern (S330), the processing beams LL1 and LL2 passing through the bi-prism 31 are irradiated to the processed target together to form the first pattern. That is, by irradiating the processing beams LL1 and LL2 to the processed target together to interfere with each other, the first pattern having minute protrusions and depressions parallel in one direction may be formed in the processed target.

In the step of rotating the bi-prism (S340), the bi-prism 31 is rotated by the predetermined angle by using the driving rotation unit. That is, by controlling the rotating driver connected to the bi-prism 31, the bi-prism 31 may be rotated by the predetermined rotation angle. In this case, the beam mask is rotated by the same angle along with the bi-prism.

In the step of forming the second pattern (S350) after the processed target is moved by the predetermined distance, the laser beam L sequentially passes through the beam mask 21 and the bi-prism 31 and then is irradiated to the processed target to form the second pattern.

To process the second pattern having the different groove direction after processing the first pattern, the first stage supporting the processed target may be moved to change the position to be irradiated with the laser beam.

Also, as shown in FIG. 10, by rotating the bi-prism by 90 degrees, for example, the processing beam incident in the new direction may be generated, and accordingly, the third pattern having the groove of the direction crossing the second pattern may be formed directly next to the second pattern.

By repeating these steps, the first pattern, the second pattern, and the third pattern that have the angles of the sequentially different groove directions may be processed in the processed target, thereby forming the anti-counterfeiting pattern in the processed target.

Figure 17:
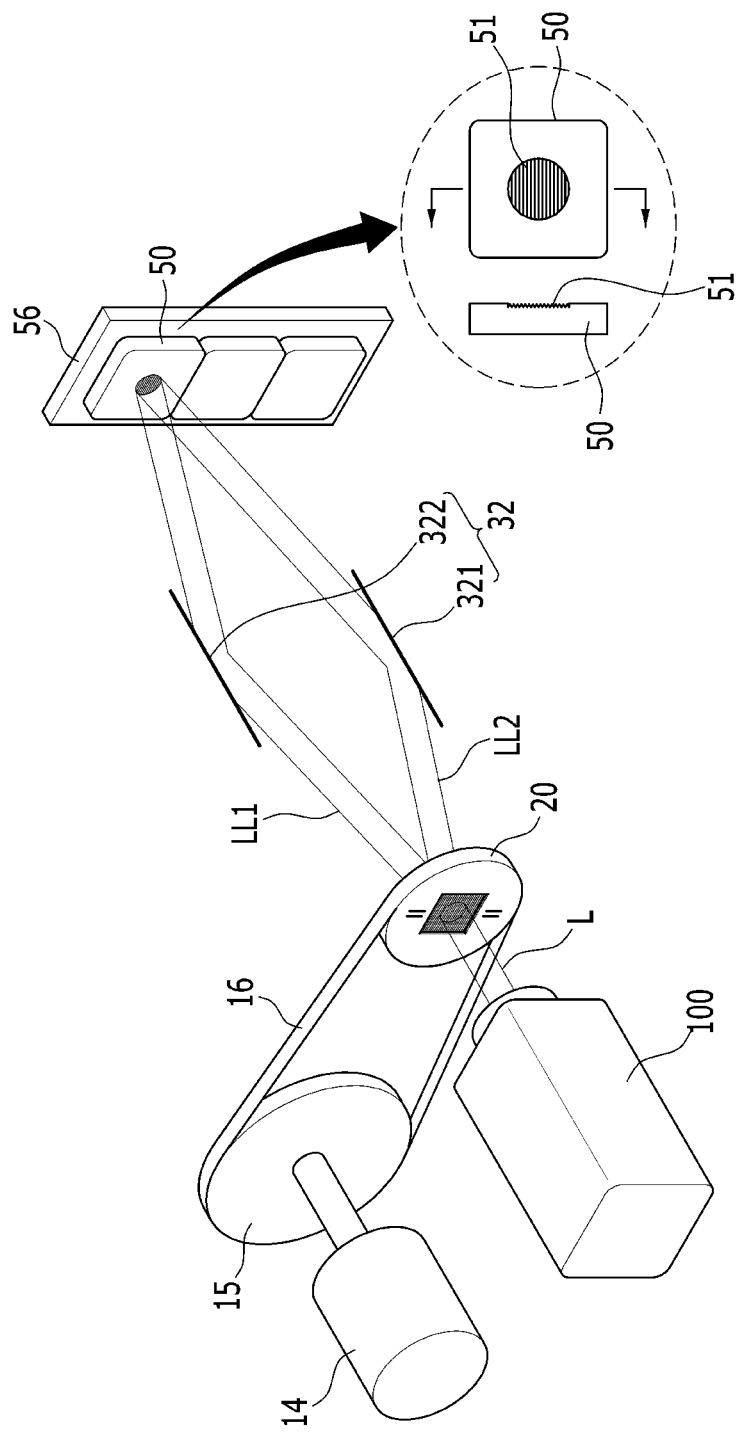
FIG. 17 and FIG. 18 are diagrams showing an anti-counterfeiting pattern processing apparatus according to a seventh exemplary embodiment of the present invention, where
Figure 18:
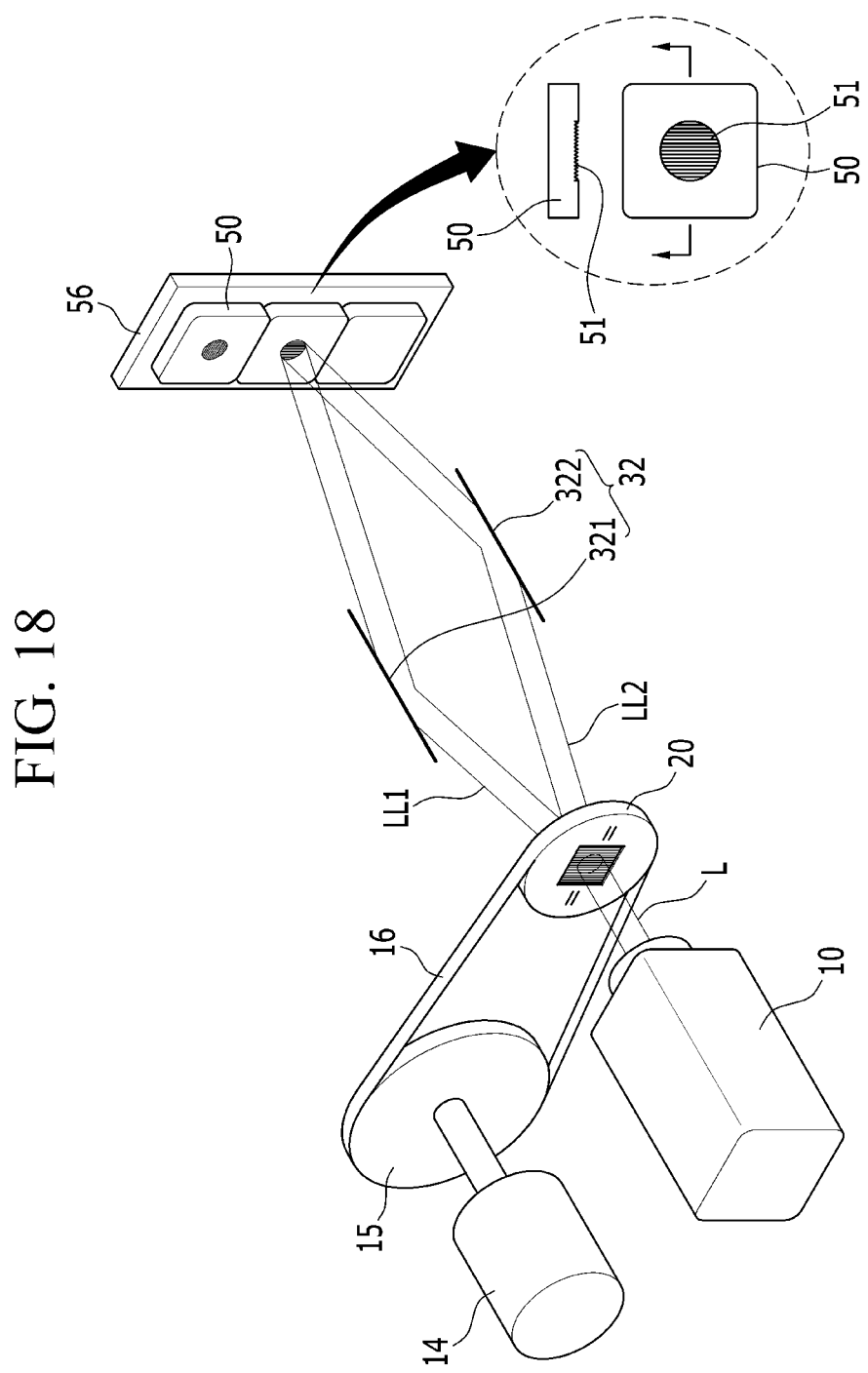

FIG. 17 and FIG. 18 are diagrams showing an anti-counterfeiting pattern processing apparatus according to the seventh exemplary embodiment of the present invention, where FIG. 17 shows a first pattern state and FIG. 18 shows a second pattern state.

As shown in FIG. 17, the anti-counterfeiting pattern processing apparatus according to an exemplary embodiment of the present invention includes the laser oscillator 10, the diffractive optical element (DOE) 20, and a pattern processing unit 32.

The laser oscillator 10 emits the laser beam L, and the emitted laser beam L is incident to the diffractive optical element 20 to be diffracted so as to be branched into a plurality of processing beams LL1 and LL2. The plurality of processing beams are irradiated to the processed target after being reflected from the pattern processing unit, and the fine pattern 51 may be formed in the processed target 50 by the irradiated processing beam.

The fine pattern 51 may be a plurality of grooves of a long shape in one direction.

In the present exemplary embodiment, the diffractive optical element 20 as a beam divider is configured to generate the processing beams LL1 and LL2 of which the laser beam L is branched into two primary diffraction lights separated from each other in the diameter direction by including the line pattern. The diffraction light includes the 0-order diffraction light progressing in the incident beam direction as well as the described primary diffraction light, and the high order diffraction light such as the secondary, the tertiary, etc. exist. The pattern design may be applied for the laser power of the 0-order diffraction light and the high order diffraction light of the diffractive optical element to be a minimum (about less than 5%) and for the laser power of the primary diffraction light to be a maximum (about more than 95%).

The diffractive optical element 20 may be rotated with respect to the axis parallel to the incident direction of the laser beam L, and for this, the diffractive optical element 20 may be formed with the circular plate shape having the circular periphery, and the rotating driver capable of rotating the diffractive optical element 20 may be provided. The rotating driver includes the pulley 15 provided on one side of the diffractive optical element 20 and the driving belt 16 connecting the periphery of the diffractive optical element 20 and the pulley 15 together. The pulley 15 is rotated by driving the motor 14 connected thereto, and the driving belt 16 may be configured to rotate the diffractive optical element 20 by the predetermined angle as the pulley 15 is rotated.

Referring to FIG. 18, the laser beam L is branched into two primary diffraction lights in the state that the diffractive optical element 20 is rotated by 90 degrees by the rotating driver. That is, in FIG. 17, two primary diffraction lights are branched to be separated from each other in the vertical diameter direction, and in contrast, in FIG. 18, two primary diffraction lights are branched to be separated from each other in the horizontal diameter direction. Accordingly, the length direction of the groove of the fine pattern 51 formed in the processed target 50 may have the angle difference of 90 degrees corresponding to the rotation angle of the diffractive optical element 20.

The pattern processing unit 32 to form the anti-counterfeiting pattern by reflecting the processing beam to be incident to the processed target includes a pair of reflection mirrors 321 and 322 respectively incident with the branched processing beams LL1 and LL2 by the diffractive optical element 20.

The angle of the reflection mirrors 321 and 322 may be controlled to direct the processing beams LL1 and LL2 to the processed target. In FIG. 17, the reflection mirrors 321 and 322 are installed to reflect in the direction opposite to the incident direction of the processing beams LL1 and LL2, however the reflection mirrors 321 and 322 may be installed to reflect to the side of the incident direction of the processing beams LL1 and LL2.

Figure 19:
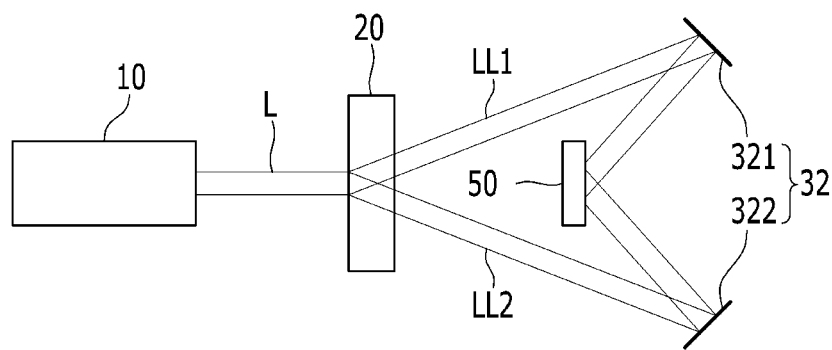
FIG. 19 is a schematic diagram showing an anti-counterfeiting pattern processing apparatus according to the eighth exemplary embodiment of the present invention.

FIG. 19 is a schematic diagram of an anti-counterfeiting pattern processing apparatus according to an eighth exemplary embodiment of the present invention. The anti-counterfeiting pattern processing apparatus according to the eighth exemplary embodiment is the same as the anti-counterfeiting pattern processing apparatus according to the seventh exemplary embodiment except for installing the reflection mirrors 321 and 322 to reflect in the side of the incident direction of the processing beams LL1 and LL2.

When installing the reflection mirrors 321 and 322 as shown in FIG. 19, the size of the anti-counterfeiting pattern processing apparatus may be reduced compared with the case of installing the reflection mirror as shown in FIG. 17 of the seventh exemplary embodiment.

The processed target 50 is mounted on the stage (not shown), and the position of the processed target 50 may be moved to the position where the processing beams LL1 and LL2 are irradiated. The processed target 50 may be made of the thin film metal or the polymer. For example, an aluminum thin plate may be coated on the paper and the fine patterns having the different groove length directions may be processed on the surface thereof, and the fine patterns having the different directions may be processed on the polymer material surface or inside the polymer material.

Meanwhile, in the present exemplary embodiment, like the described first exemplary embodiment, the diffractive optical element 20 may be configured to branch the laser beam L into two primary diffraction lights separated from each other in the diameter direction by including the line pattern, and as the primary diffraction light has the laser power of more than 95% according to the pattern design of the diffractive optical element 20, two branched processing beams LL1 and LL2 interfere with each other to form the fine pattern in the processed target.

Furthermore, the diffraction light selector 44 shown in FIG. 4 may be positioned between the diffractive optical element 20 and the pattern processing units 321 and 322.

The anti-counterfeiting pattern may be easily formed by using the anti-counterfeiting pattern processing apparatus of the present invention.

First, the laser oscillator 10 generates the laser beam L. The laser beam L may be used by selecting the laser having the power and the wavelength that are appropriate for the pattern processing, and may be changed depending on the material of the processed target.

The laser beam L is incident to the diffractive optical element 20 and then is branched into the plurality of processing beams of the diffraction light. For example, as the primary diffraction light has the laser power of more than 95%, two branched processing beams may be formed and the diffraction light selector may be used.

Next, the branched processing beams are incident to the reflection mirror of the pattern generating unit and are reflected to be irradiated to the processed target. By irradiating the processing beams together to the processed target to interfere with each other, the first pattern with the plurality of grooves parallel in one direction may be formed in the processed target.

Next, the diffractive optical element 20 is rotated by the predetermined angle. That is, by controlling the rotating driver connected to the diffractive optical element 20, the diffractive optical element 20 may be rotated by the predetermined rotation angle and may be fixed.

Next, after the processed target is moved by a predetermined distance, the laser beam L sequentially passes through the diffractive optical element 20 and the pattern processing unit to be irradiated to the processed target, thereby processing the second pattern. That is, to process the second pattern having the different length direction of the groove after processing the first pattern, the first stage supporting the processed target may be moved to change the position to irradiate the laser beam. Next, as shown in FIG. 17, the diffractive optical element, for example, may be rotated by 90 degrees to generate the new diffraction pattern, and accordingly, the third pattern having the long groove in the vertical direction may be formed directly next to the second pattern having the long groove in the horizontal direction.

By repeating these steps, the first pattern, the second pattern, the third pattern, the like having the sequentially different length directions of the grooves may be processed on the processed target, thereby forming the anti-counterfeiting pattern on the processed target.

Meanwhile, when the condenser lens is included on the moving path of the laser beam, air breakdown may be generated, however in the present invention, since the laser beam does not pass through the condenser lens after being branched before being irradiated to the processed target, the air breakdown due to the condenser lens is not generated.

Figure 20:
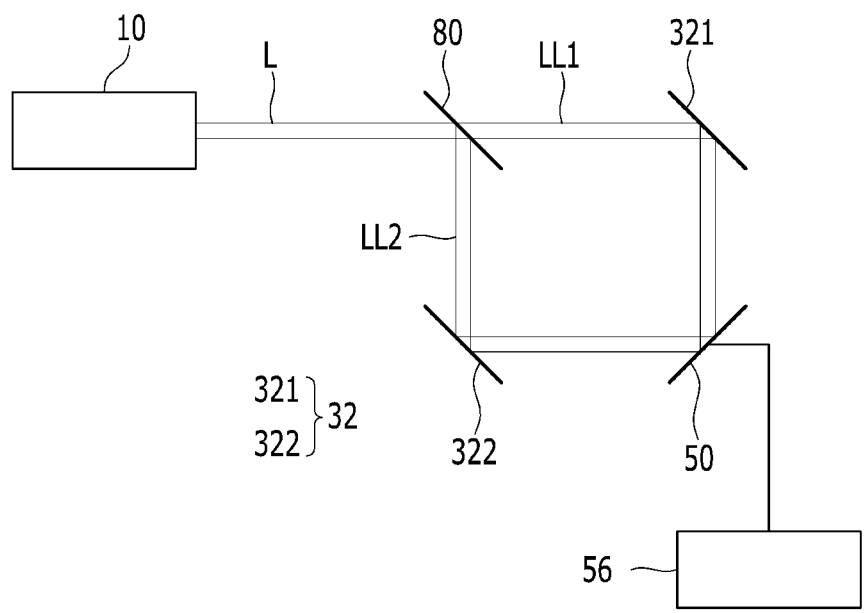
FIG. 20 is a schematic diagram of an anti-counterfeiting pattern processing apparatus according to a ninth exemplary embodiment of the present invention.

FIG. 20 is a schematic diagram showing an anti-counterfeiting pattern processing apparatus according to a ninth exemplary embodiment of the present invention.

As shown in FIG. 20, the anti-counterfeiting pattern processing apparatus according to the present exemplary embodiment includes the laser oscillator 10, a first beam splitter 80, and the pattern processing unit 32.

The laser oscillator 10 emits the laser beam L that is appropriate for the processed target 50 to be processed.

The first beam splitter 80 as the beam divider branches the incident laser beam L into a plurality of processing beams. That is, the part of the laser beam incident to the first beam splitter 80 passes through the first beam splitter 80, and the rest of the laser beam is reflected from the first beam splitter 80 such that the laser beam L incident to the first beam splitter 80 is branched into the plurality of processing beams LL1 and LL2.

The pattern processing unit 32 includes a pair of reflection mirrors 321 and 322 to reflect the plurality of processing beams LL1 and LL2 to the processed target.

The laser beam L emitted from the laser oscillator 10 is incident to the first beam splitter 80 to be branched into the plurality of processing beams LL1 and LL2. The processing beams LL1 and LL2 are reflected from the reflection mirrors 321 and 322 of the pattern processing unit 32 to be irradiated to the processed target 50. As the processing beams LL1 and LL2 are irradiated together to the processed target 50 to interfere with each other, the anti-counterfeiting pattern including the fine pattern may be formed in the processed target.

As shown in FIG. 17, the fine pattern includes a plurality of grooves that are long in one direction.

In the anti-counterfeiting pattern processing apparatus of FIG. 20, to form the first pattern and the second pattern, the first pattern and the second pattern may be sequentially formed by rotating the processed target 50. That is, after forming the first pattern, by rotating the first stage 56, the processed target 50 is rotated by a predetermined angle and the laser is irradiated to form the second pattern.

Figure 21:
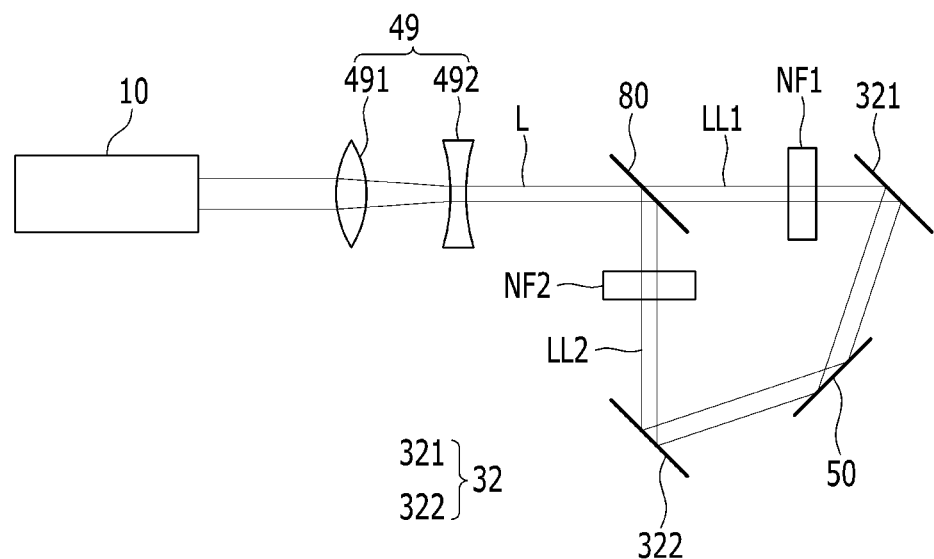
FIG. 21 is a schematic diagram of an anti-counterfeiting pattern processing apparatus according to a tenth exemplary embodiment of the present invention.

FIG. 21 is a schematic diagram of an anti-counterfeiting pattern processing apparatus according to a tenth exemplary embodiment of the present invention.

As shown in FIG. 21, the anti-counterfeiting pattern processing apparatus according to the present exemplary embodiment includes the laser oscillator 10, the pattern processing unit 32, the first beam splitter 80, and a beam reducer 49.

The laser oscillator 10 emits the laser beam L, and the first beam splitter 80 branches the incident laser beam L to generate the plurality of processing beams LL1 and LL2.

The beam reducer 49 includes a convex lens 491 and a concave lens 492, and controls the diameter of the beam to immunize light leakage by the first beam splitter.

To increase the processing capacity in the processed target, energy of the laser incident to the processed target must be large.

However, if the energy of the laser is increased, the surface of the first beam splitter passing the laser may be processed. Accordingly, like the present invention, by reducing the diameter of the beam by using the beam reducer, the processing capacity of the laser beam for the processed target may be increased without the processing of the surface of the first beam splitter and the reduction of the laser energy.

The pattern processing unit 32 to irradiate the incident light to the processed target to be processed includes reflection mirrors 321 and 322. The pattern processing unit 32 may include, as shown in FIG. 20, a pair of reflection mirrors.

Also, ND (Neutral Density) filters NF1 and NF2 may be disposed between the first beam splitter 80 and the reflection mirrors 321 and 322.

The power of the branched processing beams LL1 and LL2 may be different through the first beam splitter 80. Accordingly, by disposing the element capable of variously changing the laser power, for example, the element reducing the laser power like the ND filter, the power of the processing beam may be controlled such that the powers of two processing beams may be the same.

Figure 22:
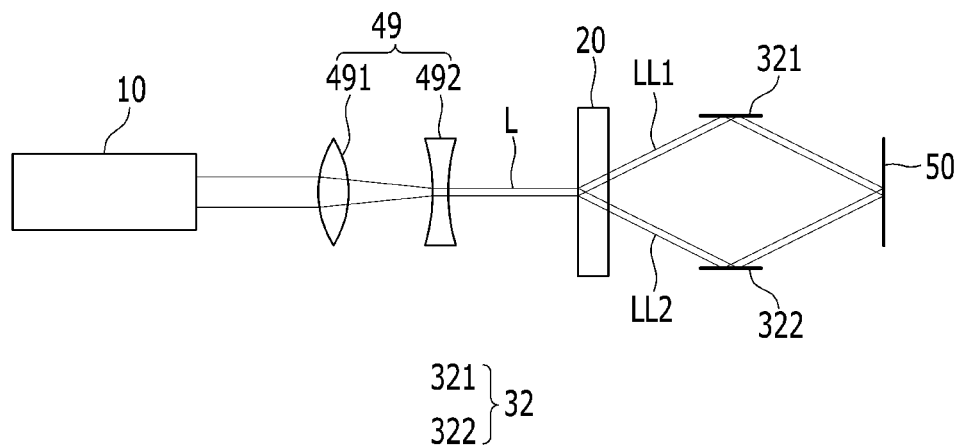
FIG. 22 is a schematic diagram of an anti-counterfeiting pattern processing apparatus according to an eleventh exemplary embodiment of the present invention.

FIG. 22 is a schematic diagram of an anti-counterfeiting pattern processing apparatus according to an eleventh exemplary embodiment of the present invention.

As shown in FIG. 22, the anti-counterfeiting pattern processing apparatus according to the present invention includes the laser oscillator 10, the diffractive optical element 20, the pattern processing unit 32, and the beam reducer 49.

The laser oscillator 10 emits the laser beam L, and the diffractive optical element 20 branches the laser beam L into the plurality of processing beams LL1 and LL2.

The processing beams LL1 and LL2 are irradiated together to the processed target 50 to interfere with each other after being reflected from the reflection mirrors 321 and 322 of the pattern processing unit 32, thereby forming the anti-counterfeiting pattern of the minute protrusions and depressions shape parallel in one direction in the processed target.

Figure 23:
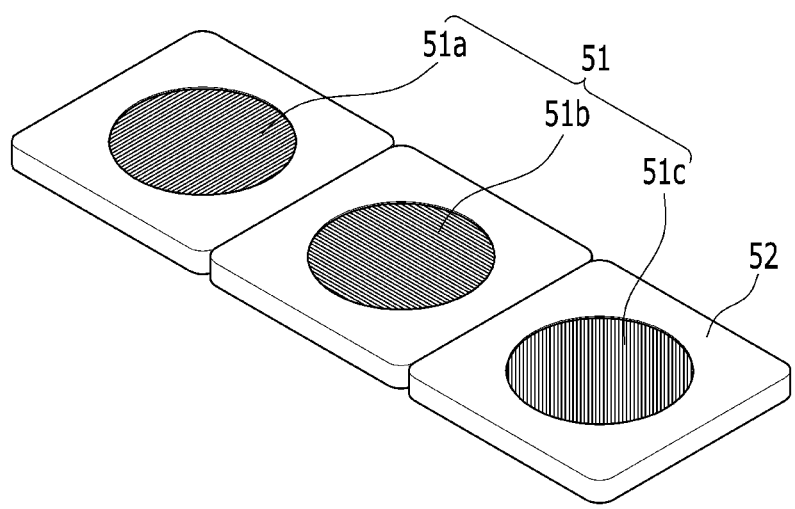
FIG. 23 is a perspective view showing one example of an anti-counterfeiting pattern of an object to confirm authenticity and an encrypted identification symbol by using an anti-counterfeiting pattern detecting apparatus according to a twelfth exemplary embodiment of the present invention.

FIG. 23 is a perspective view showing one example of an anti-counterfeiting pattern of an object to confirm authenticity and an encrypted identification symbol by using an anti-counterfeiting pattern detecting apparatus according to a twelfth exemplary embodiment of the present invention.

Referring to FIG. 23, through the anti-counterfeiting pattern detecting apparatus according to the twelfth exemplary embodiment of the present invention, like the above-described processed target 50 of the FIG. 6, the minute protrusions and depressions with directionality are formed in the fine pattern parts 51a, 51b, and 51c of the anti-counterfeiting pattern 51 processed in an object 52, and the minute protrusions and depressions with the directionality means a structure in which the grooves (the line shape is concave and dug long in the surface) are regularly arranged at a constant interval. In this case, a pitch of the grooves formed in the fine pattern parts 51a, 51b, and 51c may be in a range from 100 nm to 100 μm. When the pitch of the grooves is more than 100 μm, although the laser beam is irradiated to the fine pattern parts 51a, 51b, and 51c, the diffraction phenomenon is not generated and the pattern of the grooves is still reflected, while when the pitch is less than 100 nm, it is difficult to form them through the laser process.

In the fine pattern parts 51a, 51b, and 51c, the minute protrusions and depressions may be formed to be extended in the different directions, the first fine pattern part 51a includes the minute protrusions and depressions extending in the vertical direction (or the direction perpendicular to the fine pattern part arrangement direction), the second fine pattern part 51b includes the minute protrusions and depressions extending in the horizontal direction (or the direction parallel to the fine pattern part arrangement direction), and the third fine pattern part 51c includes the minute protrusions and depressions extending in the oblique direction.

Accordingly, by forming the minute protrusions and depressions of the fine pattern part with the directionality while changing the extending direction and setting the identification symbol depending on each direction, the anti-counterfeiting pattern can be encrypted.

Figure 24:
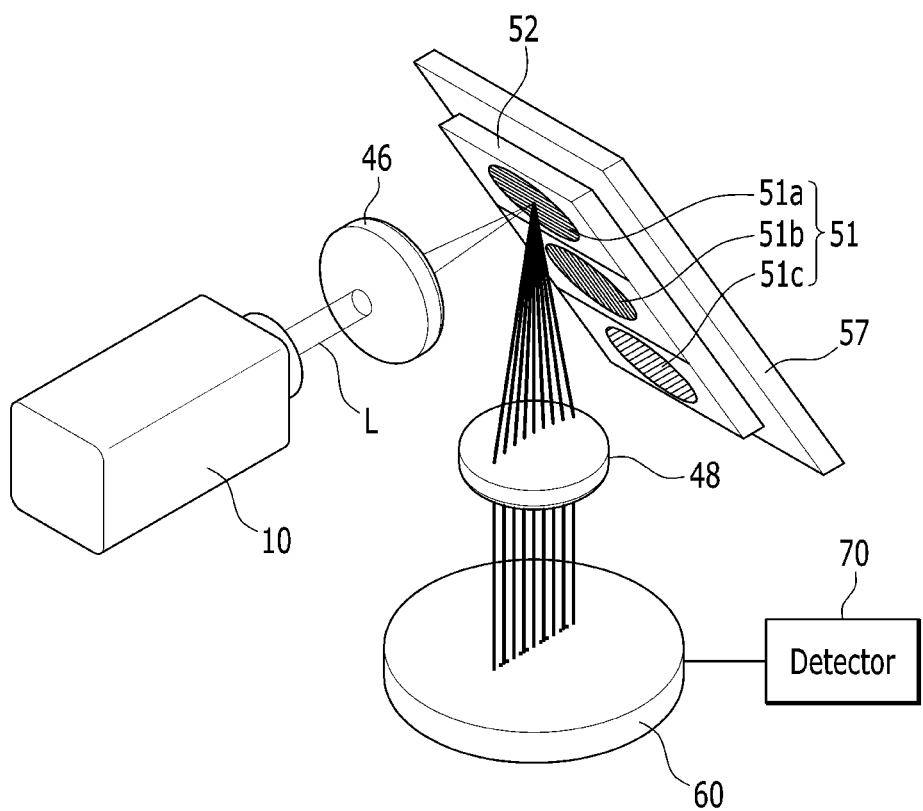
FIG. 24 to FIG. 26 are diagrams showing an anti-counterfeiting pattern detecting apparatus according to the twelfth exemplary embodiment of the present invention, where
Figure 25:
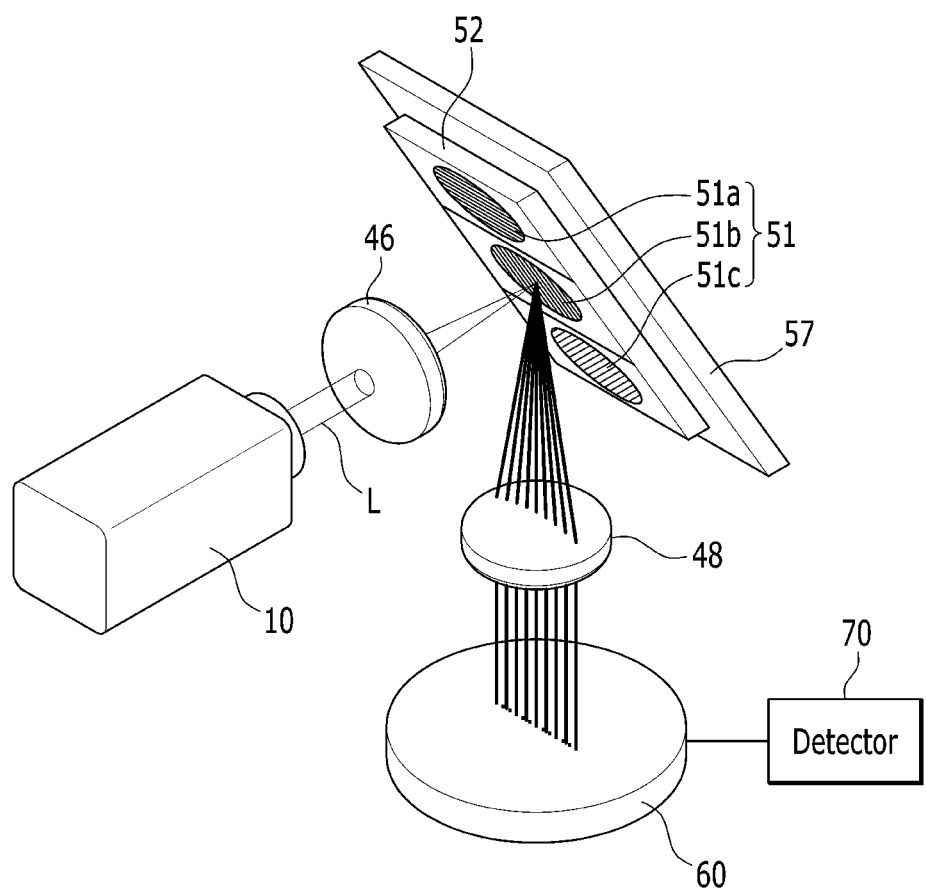
Figure 26:
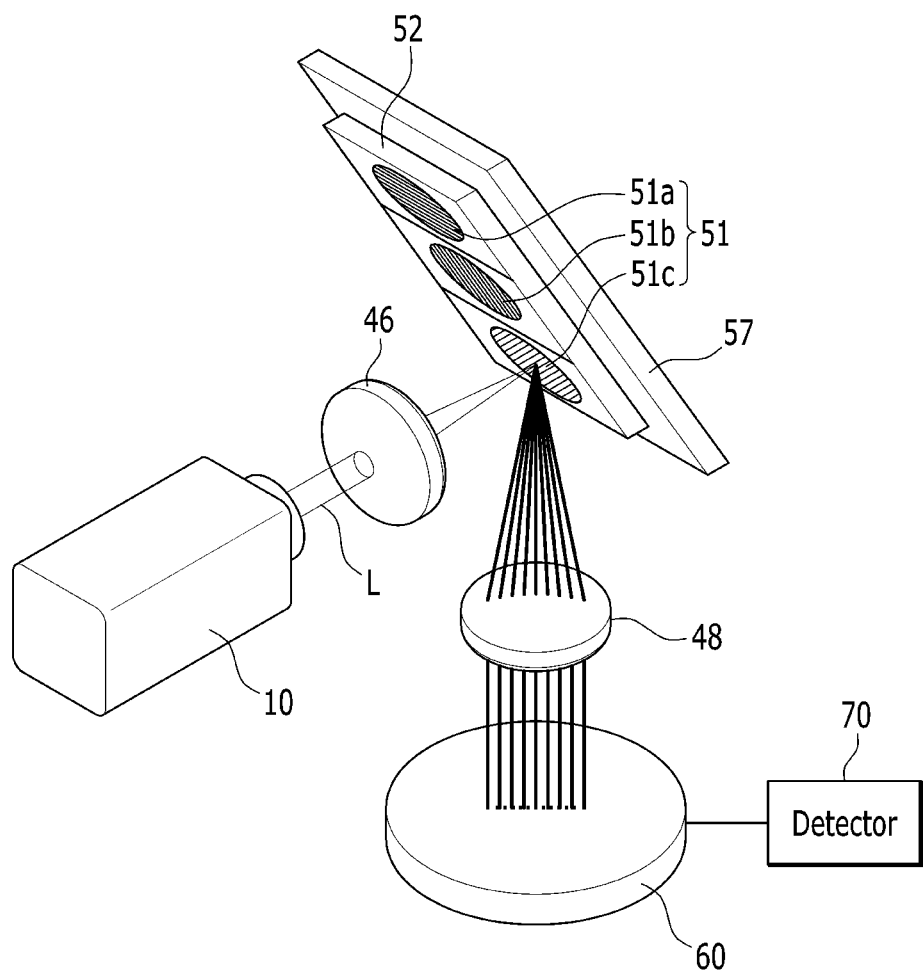

FIG. 24 to FIG. 26 are diagrams showing an anti-counterfeiting pattern detecting apparatus according to the twelfth exemplary embodiment of the present invention, where FIG. 24 is a view showing a state of sensing a first fine pattern part, FIG. 25 is a view showing a state of sensing a second fine pattern part, and FIG. 26 is a view showing a state of sensing a third fine pattern part.

Referring to FIG. 24, the anti-counterfeiting pattern detecting apparatus according to the present exemplary embodiment includes the laser oscillator 10, a first lens 46, a second lens 48, a camcorder 60, and a detector 70. The laser oscillator 10 emits the laser beam L, and the emitted laser beam L is condensed by the first lens 46 to be irradiated to the anti-counterfeiting pattern 51 of the object 52 formed with the anti-counterfeiting pattern 51. The laser beam L, for example, may use the laser beam of a 632 nm wavelength. The laser beam L is diffracted while being reflected from the anti-counterfeiting pattern 51, and passes through the second lens 48 to reach the camcorder 60. The camcorder 60 photographs the recognition pattern of the reached laser beam L to store the image. The detector 70 detects the predetermined identification symbol from the stored recognition pattern.

As an example of the first lens 46, the condenser lens may be used, and as an example of the second lens 48, a telecentric lens and an F-theta lens may be used. Also, as an example, the camcorder 60 may be applied with a CCD (Charge-coupled Device) camera.

The anti-counterfeiting pattern 51 may be formed of the pattern having the fine pattern parts with the plurality of different directions by using the laser processing system. For example, the anti-counterfeiting pattern 51 may include the first fine pattern part 51a, the second fine pattern part 51b, and the third fine pattern part 51c, and each of them includes the minute protrusions and depressions having the different extending directions. The minute protrusions and depressions may be formed to have a pitch with a micrometer scale or a nanometer scale, and for example, in the minute protrusions and depressions, the pitch of the grooves may be in the range from 100 nm to 100 μm. The anti-counterfeiting pattern 51 may include the plurality of fine pattern parts if necessary.

As described above, to detect the anti-counterfeiting pattern 51 including the plurality of fine pattern parts, the anti-counterfeiting pattern detecting apparatus according to the present exemplary embodiment may further include a second stage 57 configured to be moved while supporting the object 52. That is, as shown in FIG. 24, the laser beam L is irradiated to the first fine pattern part 51a to detect the recognition pattern of the first fine pattern part 51a, the second stage 57 is moved, and the laser beam L is respectively irradiated to the second fine pattern part 51b and the third fine pattern part 51c as shown in FIG. 25 and FIG. 26 to detect the recognition pattern of each fine pattern part.

That is, referring to FIG. 24, when irradiating the laser beam L to the first fine pattern part 51a, a diffraction pattern in which a plurality of light spots are arranged in one direction may be generated. In this case, in the diffraction pattern, the center brightest light spot is formed by the 0-order diffraction light, the light spots of both sides thereof are formed by the primary diffraction light, and the light spots formed by the high order diffraction lights such as the secondary and tertiary lights are arranged in one line. The light spot arrangement direction of the diffraction pattern may be the direction perpendicular to the extending direction of the minute protrusions and depressions of the first fine pattern part 51a.

Referring to FIG. 25 and FIG. 26, when irradiating the laser beam L to the second fine pattern part 51b and the third fine pattern part 51c, the light spot arrangement direction of the generated diffraction pattern is also rotated along the angle that the minute protrusions and depressions extending direction are rotated. Accordingly, by previously setting a measuring reference line and then measuring the light spot arrangement angle of the diffraction pattern generated from each fine pattern part, the identification symbol of the anti-counterfeiting pattern consisting of the fine pattern part may be detected.

In the present exemplary embodiment, the apparatus including the second stage 57 and detecting the plurality of fine pattern parts while moving the object is described, however an apparatus detecting the plurality of fine pattern parts by controlling the path of the laser beam L irradiated to the anti-counterfeiting pattern 51 may be configured, and this is also included in the range of the present invention.

Figure 27:
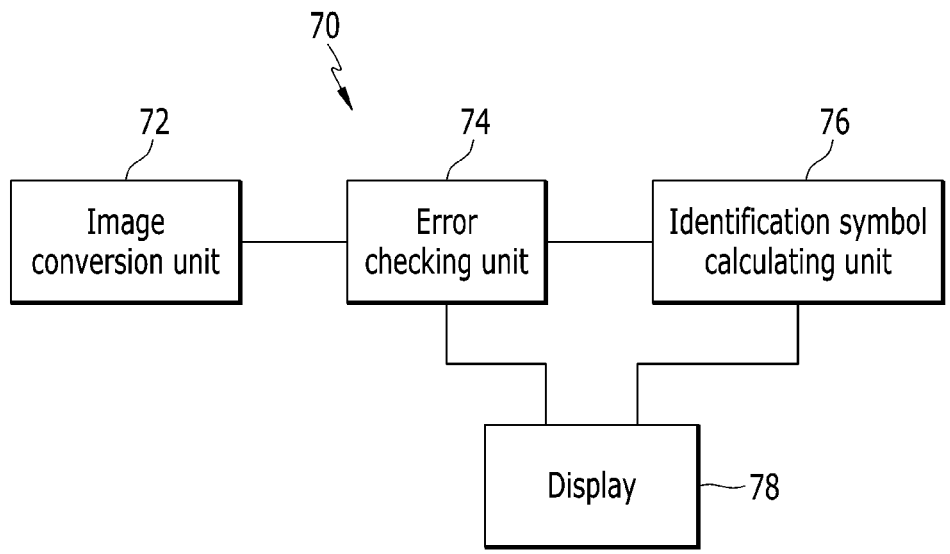
FIG. 27 is a block diagram showing a detector configuration of an anti-counterfeiting pattern detecting apparatus according to a twelfth exemplary embodiment of the present invention.

FIG. 27 is a block diagram showing a detector configuration of an anti-counterfeiting pattern detecting apparatus according to the twelfth exemplary embodiment of the present invention.

Referring to FIG. 27, the detector 70 according to the present exemplary embodiment includes an image conversion unit 72, an error checking unit 74, an identification symbol calculating unit 76, and a display unit 78.

The image conversion unit 72 converts the image of the diffraction recognition pattern photographed by the camcorder 60 to calculate the light spot arrangement angle. That is, the light spot arrangement direction confirmed from the diffraction pattern is measured, and the angle of the light spot arrangement direction with respect to the predetermined measuring reference line is measured to calculate the light spot arrangement angle.

The error checking unit 74 determines whether the calculated light spot alignment angle is included in an error range with respect to the predetermined processing rotation accuracy (processing error permitted angle). The error checking unit 74 is connected to the display unit 78, and may display the counterfeiting when the light spot alignment angle is out of the error range.

The identification symbol calculating unit 76 converts the measured light spot alignment angle into a corresponding identification symbol according to a predetermined identification symbol corresponding standard. The identification symbol may include letters or numbers, and the identification symbol for the plurality of fine pattern part is respectively calculated thereby detecting the encrypted anti-counterfeiting pattern.

Figure 28:
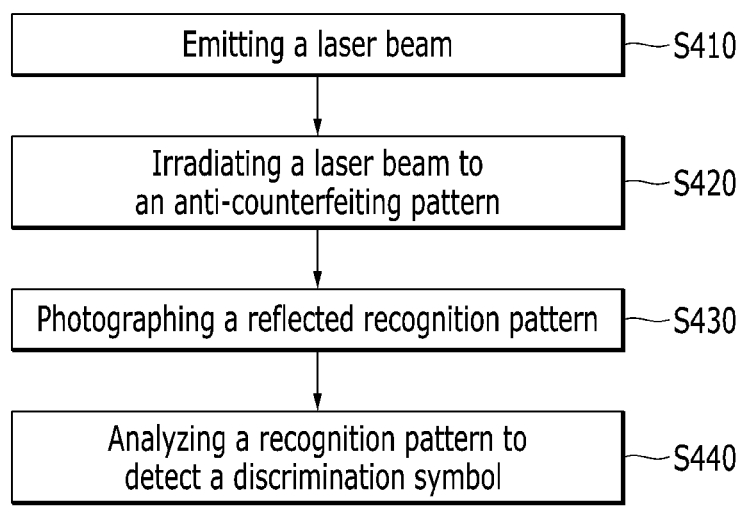
FIG. 28 is a flowchart showing an anti-counterfeiting pattern detecting method according to a thirteenth exemplary embodiment of the present invention.

FIG. 28 is a flowchart showing an anti-counterfeiting pattern detecting method according to the twelfth exemplary embodiment of the present invention.

An anti-counterfeiting pattern detecting method according to the twelfth exemplary embodiment of the present invention will be described with reference to FIG. 28.

First, the laser beam L is emitted from the laser oscillator 10 (S410).

Next, the laser beam L is condensed to be irradiated to the anti-counterfeiting pattern 51 of the object 52 formed with the anti-counterfeiting pattern 51 (S420).

That is, the laser beam L emitted from the laser oscillator 10 is condensed through the first lens 46 and is irradiated to the anti-counterfeiting pattern 51. The laser beam L irradiated to the anti-counterfeiting pattern 51 becomes the diffraction light while being reflected and diffracted and may be incident to the second lens 48. The diffraction light passing through the second lens 48 produces interference to form the recognition pattern.

The anti-counterfeiting pattern may be made of the fine pattern part having the directionality, as described with reference to FIG. 23.

Next, the recognition pattern reflected from the anti-counterfeiting pattern 51 to be the diffracted is photographed (S430).

By using the CCD camera such as the camcorder, the recognition pattern may be photographed. The recognition pattern may represent the recognition pattern of the different shapes depending on each fine pattern part of the anti-counterfeiting pattern 51.

Referring to FIG. 24 to FIG. 26, the anti-counterfeiting pattern 51 may include the first fine pattern part 51a, the second fine pattern part 51b, and the third fine pattern part 51c having the extending directions of the minute protrusions and depressions with the different angles, and the recognition patterns reflected and diffracted from each fine pattern part may represent the plurality of light spots perpendicular to the extending directions of the minute protrusions and depressions of each fine pattern part. Accordingly, the recognition pattern may represent the light spot arrangement angle corresponding to the extending direction angle of the minute protrusions and depressions of each fine pattern part for the predetermined reference.

On the other hand, the measuring accuracy may be changed depending on the distance between the camcorder and the fine pattern part. For example, as the camcorder is positioned to be further away from the fine pattern part, the measuring accuracy may be more sensitive to the change of the light spot arrangement angle or the error. Accordingly, it is necessary to determine the optimized camcorder position according to the rotation accuracy during the processing of the fine pattern part.

Next, the photographed recognition pattern is analyzed to sense the identification symbol (S440).

In the photographing step, recognition patterns of the different shapes are photographed and stored depending on each fine pattern part, and these recognition patterns may be converted into the identification symbol and detected according to the predetermined reference. That is, the first recognition pattern, the second recognition pattern, and the third recognition pattern photographed from the first fine pattern part 51a, the second fine pattern part 51b, and the third fine pattern part 51c may represent the different light spot arrangement angles from each other, and these light spot arrangement angles may be converted into the identification symbols determined depending on the angle values. When the determined identification symbol is a number, a series of number values may be produced, and when the determined identification symbol is a letter such as an alphabetic character, a series of letter strings may be produced.

Figure 29:
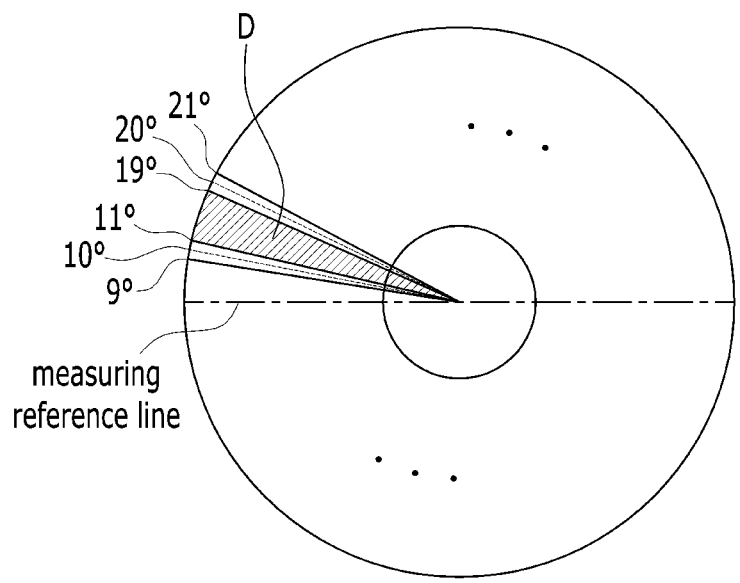
FIG. 29 is a view to explain an identification symbolic example of an anti-counterfeiting pattern.

FIG. 29 is a view to explain a symbolic identification example of an anti-counterfeiting pattern.

When forming the fine pattern (the pattern of the nanometer or micrometer scale) having the extending direction angle of the determined minute protrusions and depressions as the fine pattern part of the anti-counterfeiting pattern, the identification symbol may be produced depending on the light spot arrangement angle range of the recognition pattern for the measuring reference line.

For example, referring to FIG. 29, when the light spot arrangement angle of the recognition pattern is in the range of 9°-11°, it corresponds to the letter "A", when being in the range of 19°-21°, it corresponds to the letter "B", and the range of 29°-31° and the range of 39°-41° may correspond to the letters "C" and "D", respectively.

When processing the fine pattern part of the anti-counterfeiting pattern by using the laser processing system, in the state that the processing rotation accuracy is set as ±1°, the fine pattern part may be processed for the minute protrusions and depressions extending direction angle to be 10° and 20° with respect to the processing reference line, respectively, and the recognition pattern detected from this processed fine pattern part at least belongs to the corresponding letter range of the predetermined light spot arrangement angle.

Accordingly, when the light spot arrangement angle of the recognition pattern detected from the fine pattern part of the anti-counterfeiting pattern belongs to a range (D, a dead zone) out of the corresponding letter range with respect to the measuring reference line, the fine pattern part may be determined as a faked pattern.

Referring to FIG. 29, if the measured light spot alignment angle is positioned between 11°-19°, the document including this anti-counterfeiting pattern may be determined to be faked. That is, if the corresponding identification symbol value and processing rotation accuracy (processing error permitted angle) for the extending direction angle of the minute protrusions and depressions of the fine pattern (the pattern of the scale of the nanometer or the micrometer) are predetermined for the official anti-counterfeiting pattern processing apparatus to be confidential, even if a forger knows the extending direction angle of the minute protrusions and depressions of the fine pattern part, the processing rotation accuracy (processing error permitted angle) is unknown, so it is not possible to forge the same fine pattern part.

Figure 30:
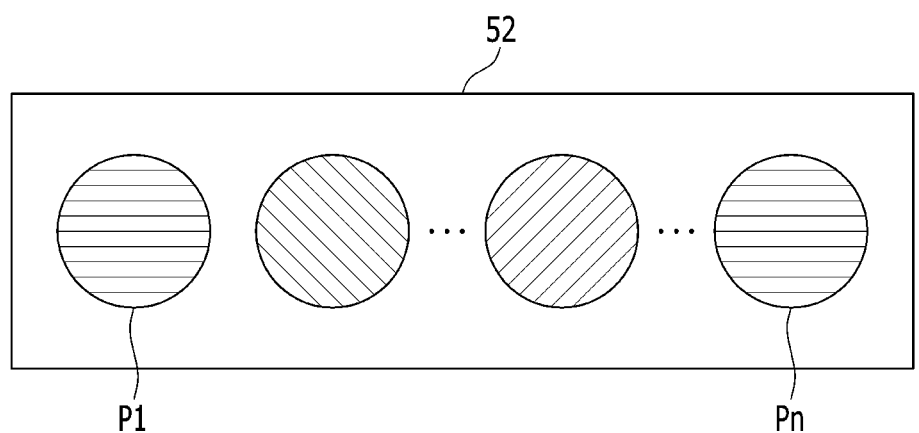
FIG. 30 is a view showing an example of an anti-counterfeiting pattern detected by an anti-counterfeiting pattern detecting method according to the thirteenth exemplary embodiment of the present invention.

FIG. 30 is a view showing an example of an anti-counterfeiting pattern sensed by an anti-counterfeiting pattern detecting method according to a thirteenth exemplary embodiment of the present invention.

When the anti-counterfeiting pattern is processed to have the plurality of fine pattern parts, the anti-counterfeiting pattern may be positioned to be twisted depending on the fixing position of the object, and in this state, if the minute protrusions and depressions formation angle of the fine pattern part is measured, the measuring error may be generated depending on the object fixing position.

Accordingly, during the anti-counterfeiting pattern processing, the reference pattern part is processed, and during the anti-counterfeiting pattern detecting, the light spot arrangement angle value of the rest of the fine pattern part may be calculated by using the light spot arrangement angle of the reference pattern part as the measuring reference line.

For example, as shown in FIG. 30, when a groove formation angles of the first fine pattern part P1 and the final fine pattern part Pn are processed to be V, the anti-counterfeiting pattern is fixed to be slanted to measure the light spot arrangement angle of each fine pattern part, and the measuring reference line is set for the light spot arrangement angle of the first fine pattern part P1 and the final fine pattern part Pn to be 0° in the detecting unit and then the rotation angles of the light spot arrangement angles of other fine pattern parts for the measuring reference line may be calculated.

An image conversion unit of the detecting unit detects the reference pattern part included in the anti-counterfeiting pattern to provide the measuring reference line of the light spot alignment angle.

Also, the measuring is possible in the state that the second stage 57 is moved to align the object.

Figure 31:
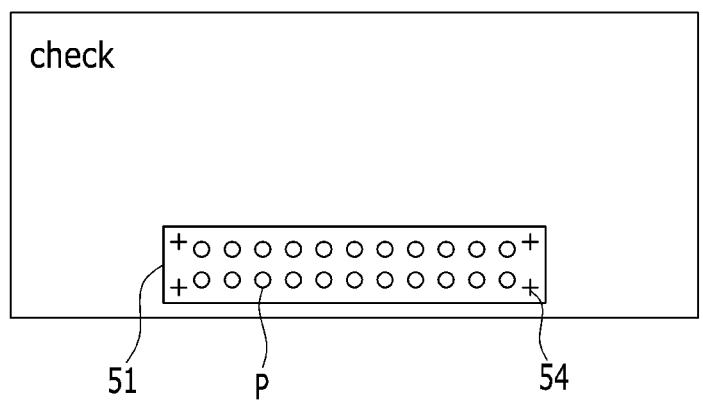
FIG. 31 is a view showing an example of adhering an anti-counterfeiting pattern detected by an anti-counterfeiting pattern detecting method according to the thirteenth exemplary embodiment of the present invention to an object.

FIG. 31 is a view showing an example of adhering an anti-counterfeiting pattern detected by an anti-counterfeiting pattern detecting method according to a thirteenth exemplary embodiment of the present invention to an object.

As shown in FIG. 31, when forming the anti-counterfeiting pattern, as another example of the reference pattern part, an alignment mark 54 is also processed and the object is aligned depending on the alignment mark 54 during the detecting to detect the anti-counterfeiting pattern 51.

The image conversion unit of the detecting unit detects the alignment mark 54 included in the anti-counterfeiting pattern to provide the measuring reference line of the light spot alignment angle.

Figure 32:
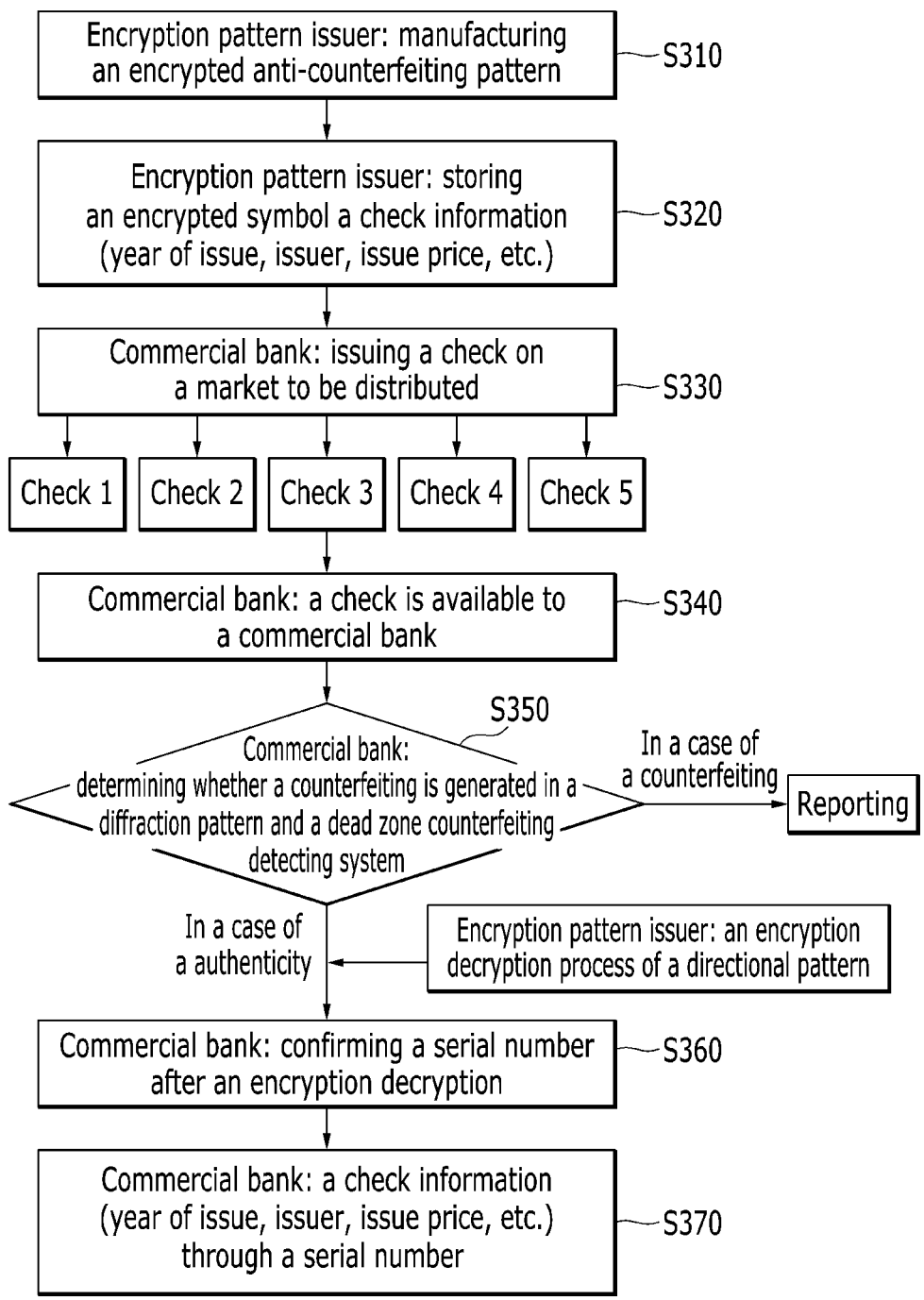
FIG. 32 is a flowchart showing a process of applying, processing, and sensing an anti-counterfeiting pattern of a check.

FIG. 32 is a flowchart showing a process of applying, processing, and sensing an anti-counterfeiting pattern for a check. The process of applying, processing, and sensing the anti-counterfeiting pattern for the check will be described with reference to FIG. 32.

Firstly, the encrypted anti-counterfeiting pattern is manufactured for the check in an encryption pattern issuer (S510).

In this case, the encrypted anti-counterfeiting pattern is stored corresponding to the encrypted symbols (letters or numbers) and the check information (year of issue, issuer, issue price, etc.) (S520).

Next, a commercial bank issues the check on the market to be distributed (S530).

Next, the check again becomes available to commercial banks (S540).

If the checks are available to commercial banks, the anti-counterfeiting pattern shown in the check is detected to determine the authenticity (S550). In this case, it is determined whether the fine pattern part of the anti-counterfeiting pattern is within the predetermined error range or the dead zone D. If the fine pattern part is within the dead zone D, the check is determined to be forged and the check may be reported to the relevant agency.

When the check is determined to be authentic, the recognition pattern represented as the anti-counterfeiting pattern is converted to analyze the identification symbol and the serial number of the check is confirmed (S560).

It is determined whether the information such as the year of the issue, the issuer, the issue price, etc., is matched (S570).

Accordingly, the bank issuing the check including the anti-counterfeiting pattern according to the present exemplary embodiment may have at least two pieces of encryption information. The first may be the corresponding identification symbol information according to the light spot arrangement angle of the fine pattern part, and the second may be the range information of the rotation accuracy set in the processing of the fine pattern part. The bank detects and identifies the anti-counterfeiting pattern based on the encryption information to determine the authenticity of the check and to confirm the information of the check.

The anti-counterfeiting pattern made of the directional fine pattern part may be applied to various fields such as luxury goods, jewelry, old documents, a passport number, an identity card, and special field markings, and the applied anti-counterfeiting pattern is detected by using the anti-counterfeiting pattern detecting apparatus according to an exemplary embodiment of the present invention, thereby preventing damage caused by the counterfeiting.

For example, information such as a production date, a production place, and a model name can be encrypted in association with the serial number in the product factory, and when the product is returned to the distributor, if the encrypted serial number is confirmed, the production date, the production place, the model name, the like may be confirmed as well as the authenticity of the product.

In the case of the jewelry, in the anti-counterfeiting pattern made of the fine pattern part having the directionality is processed inside the jewel, the authenticity of the jewel, the processing data, the processing place, and the model name may be encrypted by using this pattern, and may be identified through the detecting apparatus.

Figure 33:
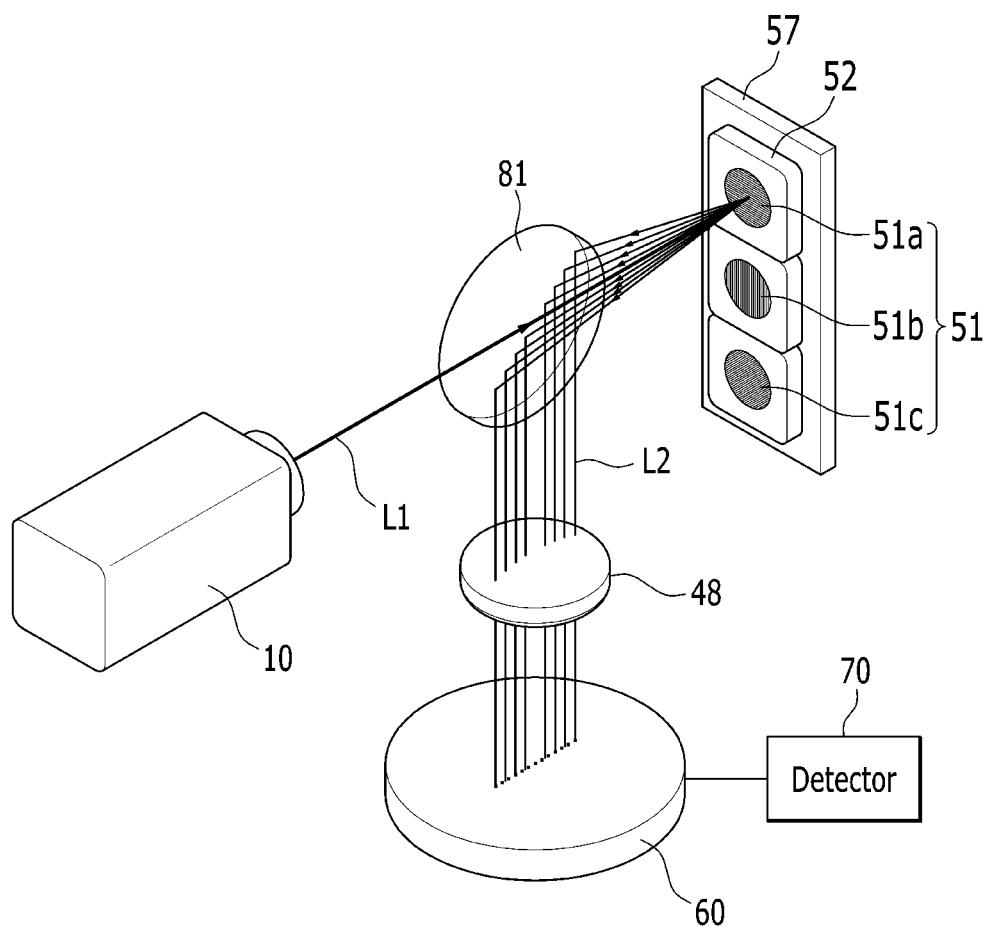
FIG. 33 to FIG. 36 are diagrams showing an anti-counterfeiting pattern detecting apparatus according to a fourteenth exemplary embodiment of the present invention, where
Figure 34:
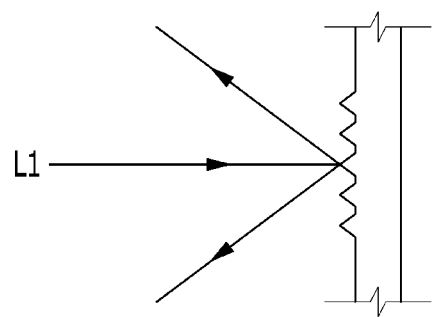
Figure 35:
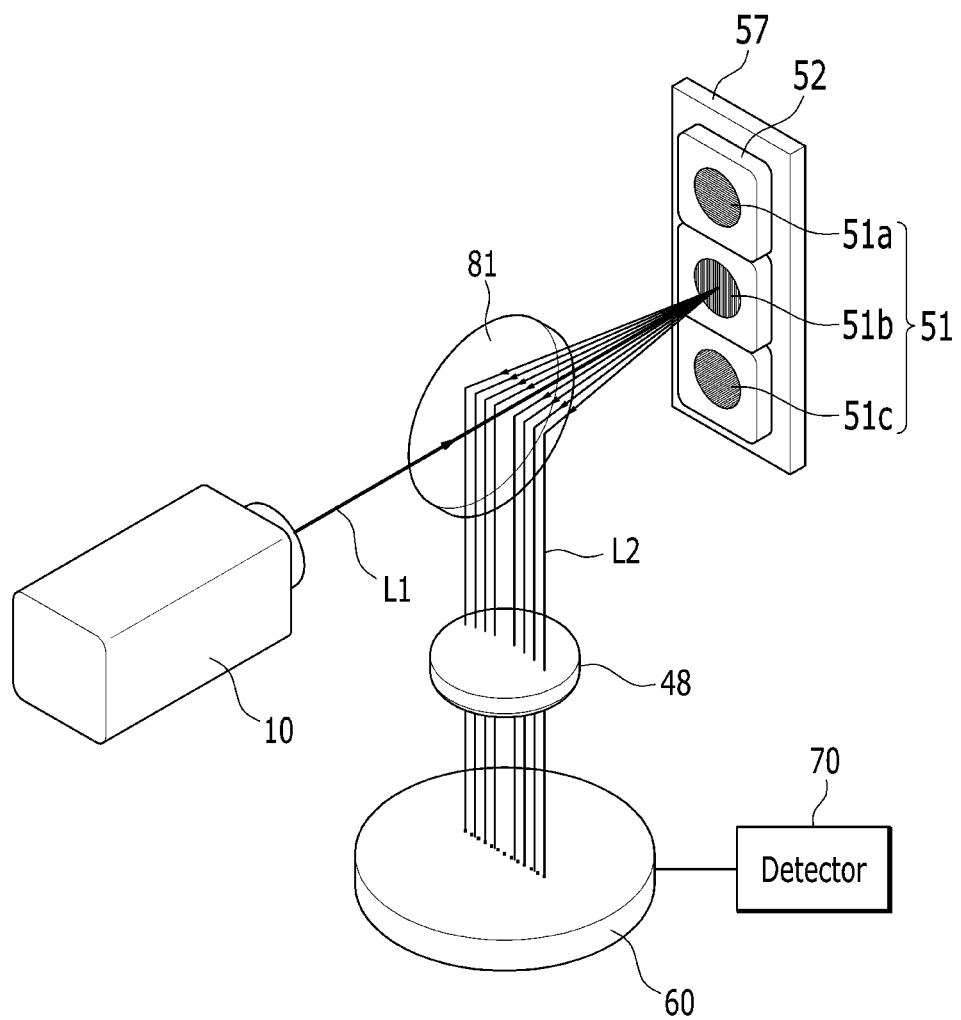
Figure 36:
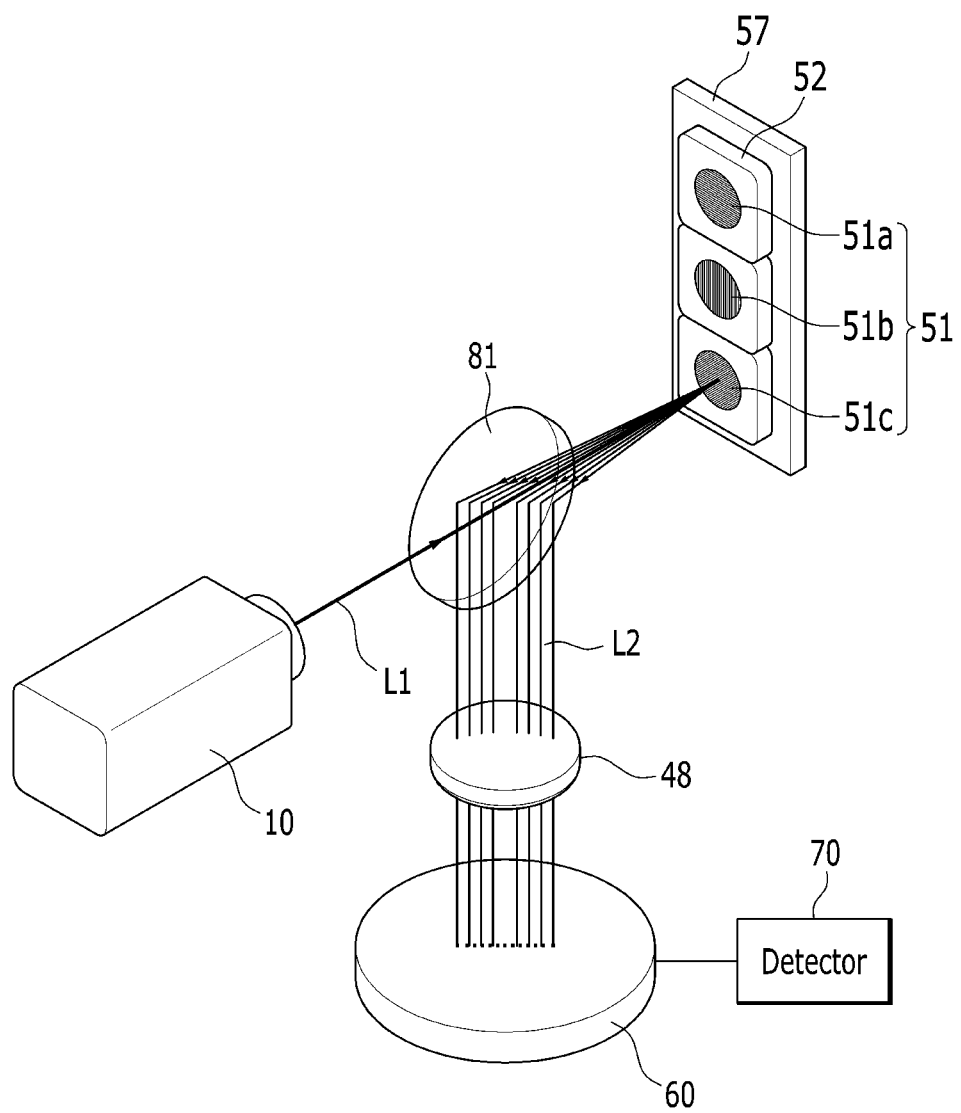

FIG. 33 to FIG. 36 are diagrams showing an anti-counterfeiting pattern detecting apparatus according to a fourteenth exemplary embodiment of the present invention, where FIG. 33 is a view showing a state of sensing a first fine pattern part, FIG. 34 is a view to explain a beam to an incident fine pattern, FIG. 35 is a view showing a state of sensing a second fine pattern part, and FIG. 36 is a view showing a state of sensing a third fine pattern part.

The anti-counterfeiting pattern according to the fourteenth exemplary embodiment of the present invention is the same as the anti-counterfeiting pattern detecting apparatus according to the twelfth exemplary embodiment except for the laser beam L1 that may be irradiated vertically with respect to the upper surface of the object 52 formed with the anti-counterfeiting pattern 51, and the schematic anti-counterfeiting pattern detecting method is the same as the anti-counterfeiting pattern detecting method according to the thirteenth exemplary embodiment.

Referring to FIG. 33, in the anti-counterfeiting pattern detecting apparatus according to the present exemplary embodiment, instead of the fourth lens 46 of the twelfth exemplary embodiment, a second beam splitter 81 is disposed. The laser oscillator 10 emits the laser beam L1, and the emitted laser beam L1 is irradiated to the anti-counterfeiting pattern 51 of the object 52 formed with the anti-counterfeiting pattern 51 through the second beam splitter 81.

The laser beam L1 is reflected by the anti-counterfeiting pattern 51 to be diffracted, and the diffraction light L2 is transmitted to the second beam splitter 81 and reaches the camcorder 60 through the fifth lens 48 after being reflected.

The anti-counterfeiting pattern 51 may be formed of the pattern having the fine pattern part having the plurality of different directions by using the laser processing system, and may include the first fine pattern part 51a, the second fine pattern part 51b, and the third fine pattern part 51c like the twelfth exemplary embodiment.

As described above, the fourteenth exemplary embodiment disposes the second beam splitter 81 instead of the fourth lens 46 of the twelfth exemplary embodiment such that the irradiation angle of the laser beam L1 may be controlled.

On the other hand, since the schematic anti-counterfeiting pattern detecting method according to the fourteenth exemplary embodiment is the same as the thirteenth exemplary embodiment, the symbolic identification example of FIG. 29, the example of the anti-counterfeiting pattern of FIG. 30 and FIG. 31, and the progressing and detecting method of the anti-counterfeiting pattern FIG. 32 may be measured and detected by the same method as the thirteenth exemplary embodiment.

Figure 37:
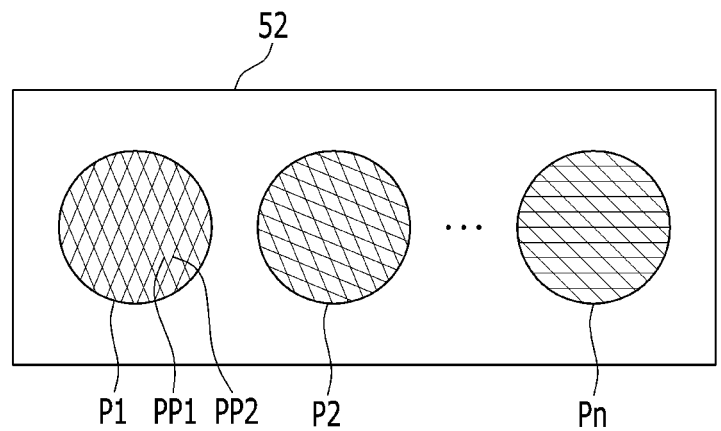
FIG. 37 is a view showing an example of an anti-counterfeiting pattern sensed by an anti-counterfeiting pattern detecting method according to a fourteenth exemplary embodiment of the present invention.
Figure 38:
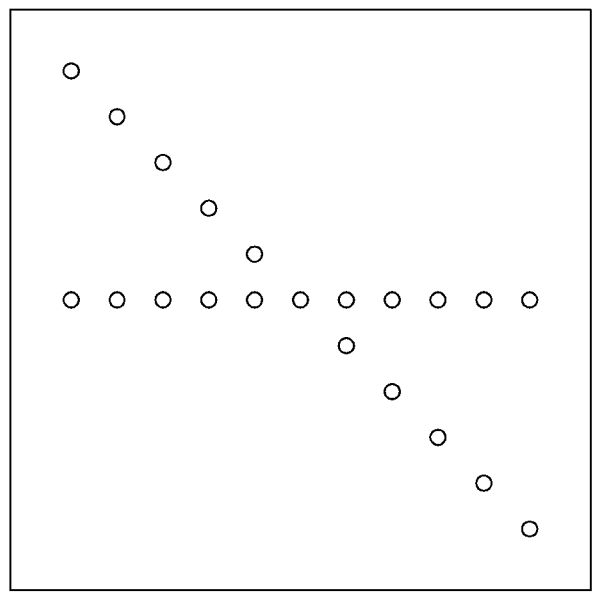
FIG. 38 is a view showing a diffraction pattern formed by using the anti-counterfeiting pattern of FIG. 37.

FIG. 37 is a view showing an example of an anti-counterfeiting pattern sensed by an anti-counterfeiting pattern detecting method according to a fourteenth exemplary embodiment of the present invention, and FIG. 38 is a view showing a diffraction pattern formed by using the anti-counterfeiting pattern of FIG. 37.

Fine pattern parts P1, P2, and Pn of the anti-counterfeiting pattern formed in the object 52 shown in FIG. 37 may be processed to have a plurality of fine patterns PP1 and PP2 extending in the different directions. In FIG. 23, the minute protrusions and depressions extending in one direction are formed in one fine pattern part, however in FIG. 37, the fine pattern part extending in the different directions, for example, the fine pattern PP1 extending in the first direction and the fine pattern PP2 extending in the second direction, may be provided together.

That is, in the fourteenth exemplary embodiment, if the laser beam is irradiated to the anti-counterfeiting pattern having the fine pattern parts P1, P2, and Pn of the different directions as shown FIG. 37, the diffraction pattern as shown in FIG. 38 may be obtained.

In this way, if the fine pattern parts of the different directions are formed, complicated and various anti-counterfeiting patterns compared with the fine pattern part of only one direction are processed such that the counterfeiting may be further difficult.

Figure 39:
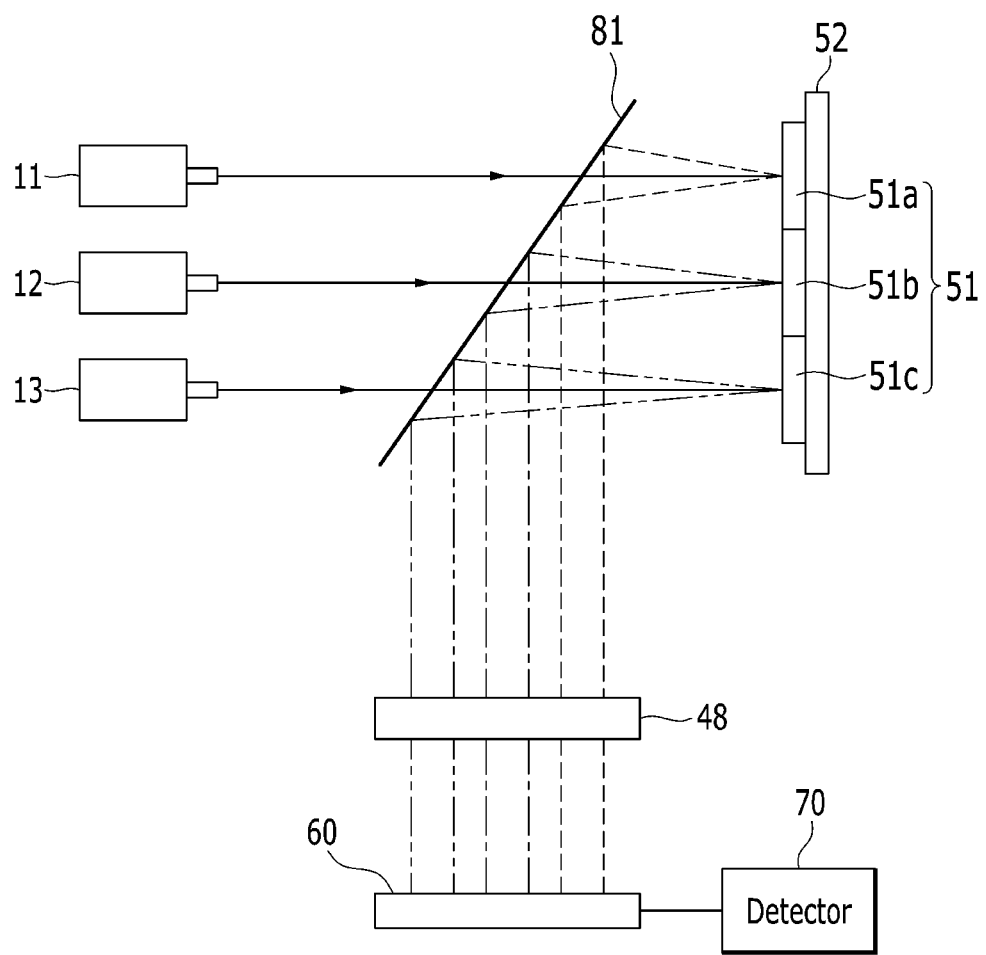
FIG. 39 is a schematic diagram of an anti-counterfeiting pattern detecting apparatus according to a fifteenth exemplary embodiment of the present invention.

FIG. 39 is a schematic diagram of an anti-counterfeiting pattern detecting apparatus according to a fifteenth exemplary embodiment of the present invention.

As shown in FIG. 39, the anti-counterfeiting pattern detecting apparatus according to the fifteenth exemplary embodiment of the present invention includes a plurality of laser oscillating units 11, 12, and 13, the second beam splitter 81, the fifth lens 48, the camcorder 60, and the detector 70. The plurality of laser oscillating units 11, 12, and 13 emit the laser beam L1, and the emitted laser beam L1 is irradiated to the anti-counterfeiting pattern 51 of the object 52 formed with the anti-counterfeiting pattern 51 through the second beam splitter 81.

The laser oscillating units 11, 12, and 13 may be disposed to respectively correspond to the plurality of anti-counterfeiting patterns.

The plurality of laser oscillating units 11, 12, and 13 do not simultaneously irradiate the laser beam to the anti-counterfeiting pattern, but irradiate laser beams one by one. That is, by using the laser beam irradiated from the first laser oscillating unit 11, the recognition pattern of the first anti-counterfeiting pattern is detected. In this case, the second and third laser oscillating units 12 and 13 are in the off state. Next, after the first laser oscillating unit 11 is turned off, by using the laser beam irradiated from the second laser oscillating unit 12, the recognition pattern of the second anti-counterfeiting pattern is detected. Finally, after the second laser oscillating unit is turned off, by using the laser beam irradiated from the third laser oscillating unit 13, the recognition pattern of the third anti-counterfeiting pattern is detected.

In this way, if the plurality of laser oscillating units 11, 12, and 13 are disposed to respectively correspond to the anti-counterfeiting pattern, the separate second stage to move the anti-counterfeiting pattern is not required.

Figure 40:
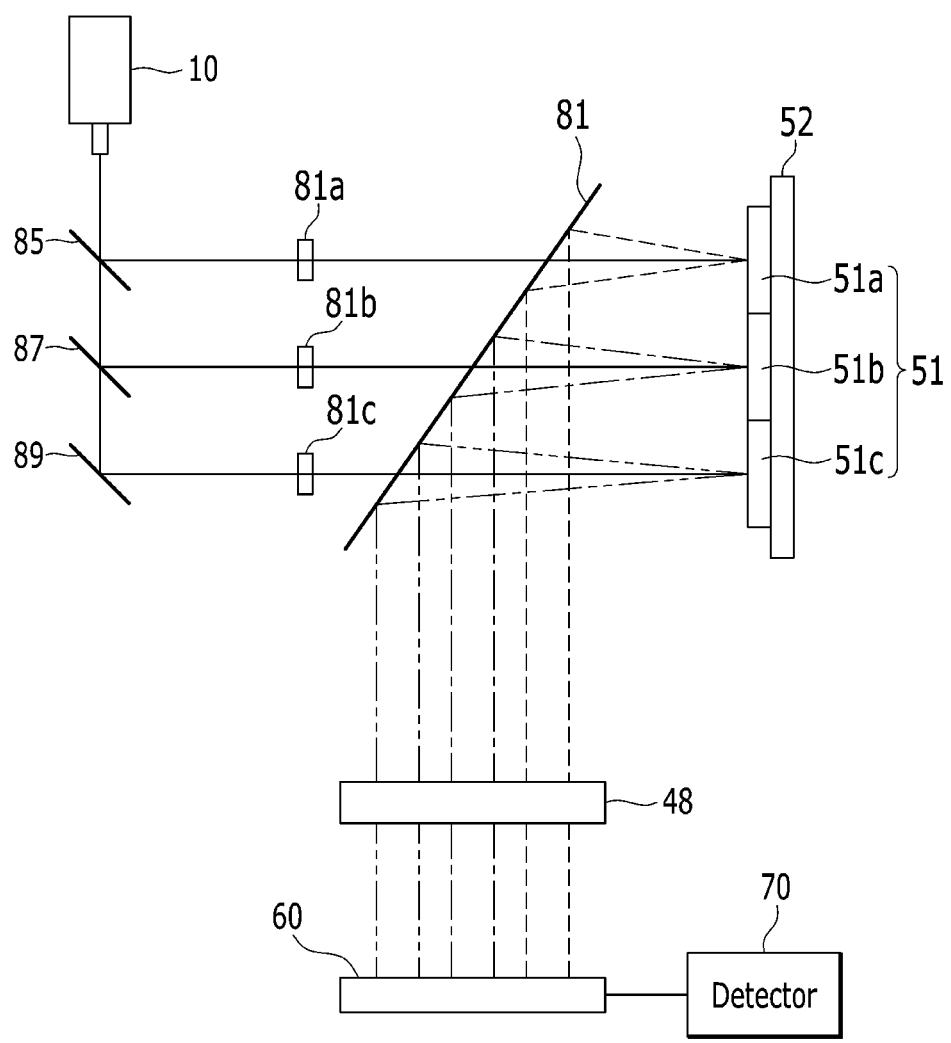
FIG. 40 is a schematic diagram of an anti-counterfeiting pattern detecting apparatus according to a sixteenth exemplary embodiment of the present invention.

FIG. 40 is a schematic diagram of an anti-counterfeiting pattern detecting apparatus according to a sixteenth exemplary embodiment of the present invention.

The anti-counterfeiting pattern detecting apparatus of FIG. 40 is similar to the anti-counterfeiting pattern detecting apparatus of FIG. 39 such that differences will be described in detail.

As shown in FIG. 40, the anti-counterfeiting pattern detecting apparatus according to an exemplary embodiment of the present invention includes the laser oscillator 10, a beam divider positioned between the laser oscillator and the second beam splitter, the second beam splitter 81, the fifth lens 48 and the camcorder 60 positioned on the path in which the diffraction light diffracted from the object 52 is reflected from the second beam splitter 81 and then passes, and the detector 70 connected to the camcorder 60.

The beam divider is positioned on the path on which the laser beam is emitted from the laser oscillator, and includes at least at least one of beam distribution units 85 and 87 positioned in one line and one reflection mirror 89. The reflection mirror 89 is positioned farthest from the laser oscillator, at the end of one line.

The beam divider divides the laser beam emitted from the laser oscillator by the number of fine pattern parts to be respectively incident to the fine pattern parts 51a, 51b, and 51c.

Shields 81a, 81b, and 81c may be respectively disposed between the beam distribution units 85 and 87 and the second beam splitter 81, and between the reflection mirror 89 and the second beam splitter 81.

The anti-counterfeiting pattern detecting apparatus of FIG. 40 may detect the anti-counterfeiting pattern of the plurality of fine pattern parts by the laser beam generated from one laser oscillator 10 without the movement of the object instead of the usage of the plurality of laser oscillating units 11, 12, and 13 like FIG. 39.

In detail, the laser oscillator 10 emits the laser beam L1 and the emitted laser beam L1 is irradiated to the anti-counterfeiting pattern 51 made of the fine pattern part formed in the object 52 after passing through the beam distribution units 85 and 87 or being reflected by the reflection mirror 89.

The laser beam L1 emitted from the laser oscillator 10 is partially reflected by the first beam distribution unit 85 to be incident to the anti-counterfeiting pattern 51 made of the fine pattern part of the object 52, and the rest of the beam is incident to the second beam distribution unit 87 through the first beam distribution unit 85.

The laser beam L1 is partially reflected by the second beam distribution unit 87 to be incident to the object 52, and the rest of the beam that is not reflected is incident to the reflection mirror 89 through the second beam distribution unit 87.

The laser beam L1 incident to the reflection mirror 89 is incident to the anti-counterfeiting pattern 51 made of the fine pattern part of the object 52 after the reflection.

In this way, by installing the plurality of beam distribution units 85 and 87 and the reflection mirror 89, the laser beam may be respectively irradiated to the plurality of fine pattern parts 51a, 51b, and 51c by using one laser beam.

On the other hand, the shields 81a, 81b, and 81c may be respectively disposed in the light path of the second beam splitter 81 positioned between the beam distribution units 85 and 87 and the reflection mirror 89, and the object.

The shields 81a, 81b, and 81c control the laser beam to be sequentially incident to the object depending on the fine pattern part to be detected.

That is, if the laser beam is reflected from the first beam distribution unit 85, the laser beam is incident to the first fine pattern part 51a through the first shield 81a in an opened state. In this case, as the second shield 81b and the third shield 81c are in a closed state, the laser beam transmitted by the second beam distribution unit 57 and the reflection mirror 89 is not incident to the second and third fine pattern parts 51b and 51c.

Also, if the laser beam is reflected from the second beam distribution unit 87, since only the second shield 81b is in the opened state, the laser beam is incident to the second fine pattern part 51b through the second shield 81b. In this case, as the first shield 81a and the third shield 81c are in the closed state, the laser beam is not incident to the first and third fine pattern parts 51a and 51c.

Finally, if the laser beam is reflected from the reflection mirror 89, since only the third shield 81c is in the opened state, the laser beam is incident to the third fine pattern part 51c through the third shield 81c. In this case, as the first shield 81a and the second shield 81b are in the closed state, the laser beam is not incident to the first and second fine pattern parts 51a and 51b.

In the above exemplary embodiment, since the fine pattern part to which the laser beam is incident may be easily selected by using the shield, the separate second stage to move the position of the object is not required.

Figure 41:
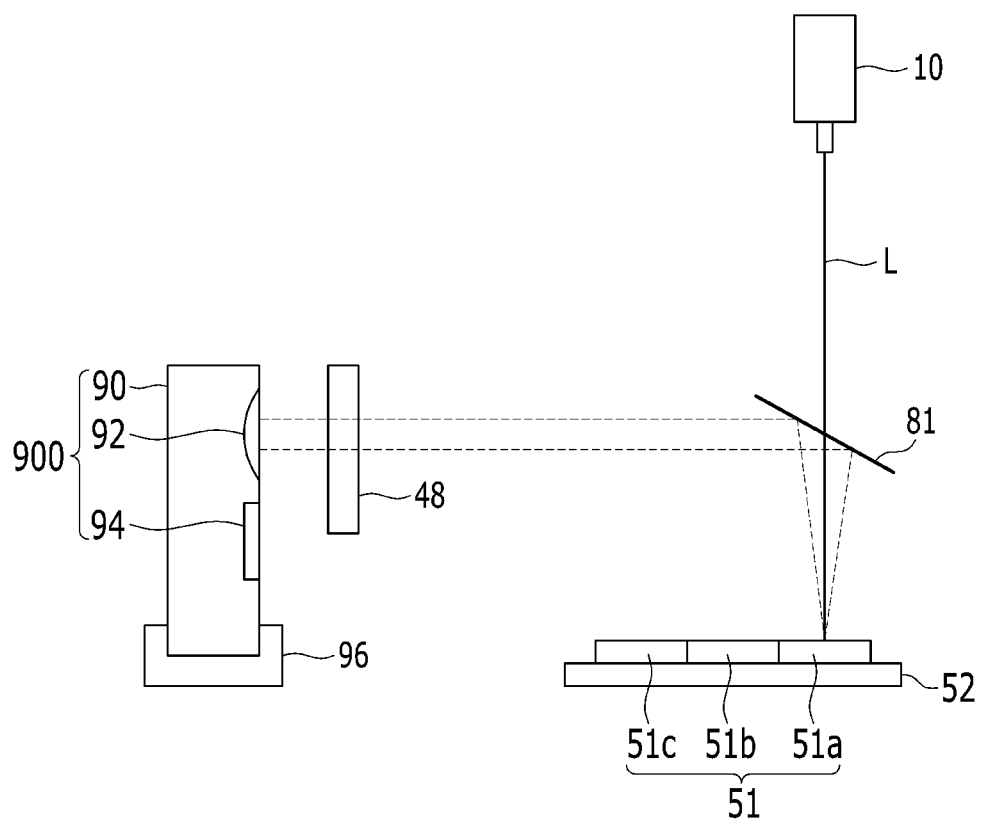
FIG. 41 is a schematic diagram of an anti-counterfeiting pattern detecting apparatus according to a seventeenth exemplary embodiment of the present invention.

FIG. 41 is a schematic diagram of an anti-counterfeiting pattern detecting apparatus according to a seventeenth exemplary embodiment of the present invention.

The anti-counterfeiting pattern detecting apparatus shown in FIG. 41 includes the laser oscillator 10, the second beam splitter 81, the fifth lens 48, and a terminal fixing unit 96 fixing a moving terminal 900.

The anti-counterfeiting pattern detecting apparatus of FIG. 41 may photograph and detect the fine pattern part by using the moving terminal 900.

The moving terminal 900 as a moving terminal capable of installing a mobile application may be a smart phone, for example. The moving terminal 900 includes a terminal main body 90, a CCD camera 92 installed to the main body 90 and used to photograph the laser beam, a data processor (not shown) to process the image data photographed by the camera, and a display part 94 displaying the image and used to operate the application. Also, the moving terminal 900 may further include a communication module (not shown) allowing phone calls and wireless data communication, and a storing unit to store the data and an operation system.

In FIG. 39 and FIG. 40, the camcorder 60 and the detector 70 are respectively installed, however, as shown in FIG. 41, by using the moving terminal such as the smart phone, the anti-counterfeiting pattern may be easily detected. That is, if the moving terminal 900 such as the smart phone is used, portability is easy, and an imaging unit and the detecting unit may be omitted such that the manufacturing cost and the space may be saved. Also, although the recognition pattern to detect the anti-counterfeiting pattern is not stored in the smart phone, the anti-counterfeiting pattern may be easily detected by downloading the mobile application.

Figure 42:
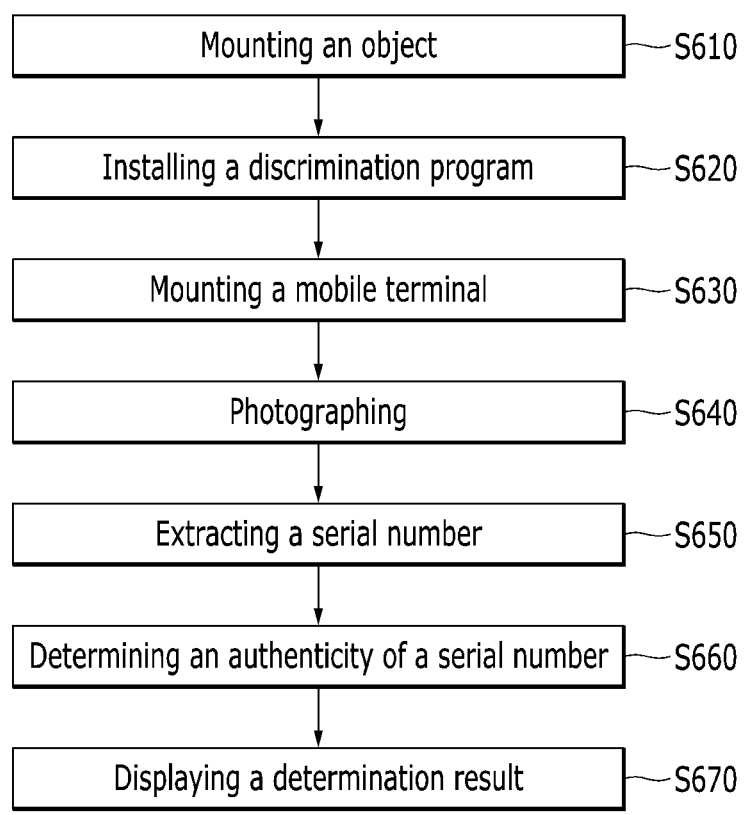
FIG. 42 is a flowchart showing an anti-counterfeiting pattern detecting method of an eighteenth exemplary embodiment of the present invention.

FIG. 42 is a flowchart showing a process of applying, generating, and detecting an anti-counterfeiting pattern to a check according to an eighteenth exemplary embodiment of the present invention.

FIG. 41 shows the flowchart to explain the method of discriminating the anti-counterfeiting pattern by using the anti-counterfeiting pattern detecting apparatus.

Firstly, the flowchart includes a step of mounting the object to be determined as counterfeit on the second stage (S610), a step of installing a discrimination program in the moving terminal (S620), a step of mounting the moving terminal to the fixing unit of the anti-counterfeiting pattern detecting apparatus (S630), a step of photographing the diffraction light by the camera of the moving terminal after irradiating the laser beam to the object (S640), a step of extracting the encrypted serial number from the photographed image (S650), a step of determining the authenticity of the serial number (S660), and a step of displaying whether there is a counterfeit through the display part of the terminal (S670).

In the step of mounting the object on the second stage (S610), the object may be the check shown in FIG. 31.

In the step of installing the discrimination program (S620), the discrimination program includes the recognition pattern, and the angle of the fine pattern part is measured from the photographed image to extract the encrypted serial number from the rotation angle. Also, the discrimination program may transmit or receive the extracted serial number to or from the encryption pattern issuer by using the communication module built in the moving terminal.

Further, the discrimination program may include the information for the serial number corresponding to the encryption pattern to compare the extracted serial number. That is, in the case of the specialized agency such as the bank, since the case of discriminating the luxury goods or expensive artwork almost does not exist in the bank, the serial number according to the encryption pattern to discriminate bills or the checks may be previously transmitted from the issuer to be included in the discrimination program. The serial number according to the encryption pattern may be periodically updated.

In the mounting step (S630), the moving terminal installed with the discrimination program is mounted to the fixing unit to transmit the diffraction light reflected from the object to the camera of the moving terminal.

In the photographing step (S640), the diffraction light is incident to the camera of the moving terminal, and the camera extracts the diffraction pattern from the diffraction light to be imagined.

In the step of extracting the serial number (S650), the angle from the diffraction pattern photographed by the camera is measured to extract the serial number corresponding to the angle.

In the step of determining the authenticity of the serial number (S660), the extracted serial number is transmitted to the discriminating unit of the issuer issuing the encryption pattern. Also, the discriminating unit of the issuer determines whether there is a counterfeit from the transmitted serial number information and transmits the result thereof to the moving terminal.

In this case, when the discrimination program of the moving terminal includes the serial number information according to the encryption pattern, the authenticity may be directly determined by using the discrimination program without the transmission to the issuer.

In the step of displaying the counterfeit existence (S670), the counterfeit existence transmitted to the moving terminal is displayed on the display part of the terminal, thereby easily identifying the counterfeiting of the object.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for processing an anti-counterfeiting pattern, comprising:
    a laser oscillator emitting a laser beam;
    a beam mask positioned on a path where the laser beam passes and having a plurality of openings through which the laser beam passes;
    a bi-prism positioned on a path where the laser beam passes;
    a rotating driver rotating the bi-prism;
    a shutter positioned between the laser oscillator and the beam mask; and
    a first stage supporting a processed target and configured to be movable,
    wherein an edge of the laser beam is cut by the shutter,
    wherein the beam mask is positioned between the laser oscillator and the bi-prism, and configured to branch the laser beam into a plurality of processing beams,
    wherein the plurality of processing beams are refracted while passing through the bi-prism, and simultaneously incident to the processed target, and
    wherein the bi-prism is configured to irradiate the plurality of processing beams to the processed target together to interfere with each other,
    wherein the bi-prism is rotated with respect to an axis parallel to a direction in which the laser beam is incident,
    wherein the bi-prism is rotated by a predetermined angle, and the processed target is moved by a predetermined distance, such that a plurality of patterns are sequentially formed on the processed target while spaced apart by the predetermined distance and respectively having different directions corresponding to a rotation angle of the bi-prism, and
    wherein the beam mask is rotated by the predetermined angle along with the bi-prism.

2. The apparatus of claim 1, wherein
    the bi-prism has a reference surface facing the beam mask, and a first inclination surface and a second inclination surface inclined in different directions with respect to the reference surface, and
    the rotating driver includes:
    a circular plate attached to the reference surface and having a circular periphery;
    a pulley provided at one side of the bi-prism; and
    a driving belt connecting the circular plate and the pulley together to rotate the bi-prism by the predetermined angle as the pulley is rotated.

3. An apparatus for detecting an anti-counterfeiting pattern, wherein the anti-counterfeiting pattern includes a plurality of fine pattern parts respectively having different directions, and each of the plurality of fine pattern parts includes a plurality of minute protrusions and depressions, comprising:
    a laser oscillator emitting a laser beam;
    a second beam splitter positioned on a path where the laser beam to be irradiated to the anti-counterfeiting pattern passes;
    a beam divider positioned between the laser oscillator and the second beam splitter;
    a camcorder photographing a diffraction pattern of a diffraction light that is reflected from the anti-counterfeiting pattern to be diffracted;
    a fifth lens positioned between the anti-counterfeiting pattern and the camcorder; and
    a detector analyzing the photographed diffraction pattern to detect an identification symbol,
    wherein the laser beam irradiated to the anti-counterfeiting pattern is diffracted to be the diffraction light while being reflected from the anti-counterfeiting pattern, the diffraction light is reflected from the second beam splitter and is transmitted to the camcorder through the fifth lens,
    wherein the beam divider includes at least one beam distribution unit and a reflection mirror positioned in one line,
    wherein the reflection mirror is positioned farthest from the laser oscillator, the laser beam is partially reflected by the at least one beam distribution unit to be incident to the anti-counterfeiting pattern, rest of the laser beam is incident to the reflection mirror through the at least one beam distribution unit, and rest of laser beam incident to the reflection mirror is incident to the anti-counterfeiting pattern,
    wherein a plurality of shields are respectively disposed on a path of the laser beam between the at least one beam distribution unit and the second beam splitter, and between the reflection mirror and the second beam splitter,
    wherein each of the plurality of shields is selectively opened or closed,
    wherein the beam divider is configured to divide the laser beam by a number of the plurality of fine pattern parts to respectively correspond to the plurality of fine pattern parts, and wherein the detector is configured to measure a light spot arrangement angle of the diffraction pattern generated from the each of the plurality of fine pattern parts having different directions.

4. The apparatus of claim 3, wherein
the anti-counterfeiting pattern is disposed for the laser beam passing through the second beam splitter to be perpendicularly incident with respect to the anti-counterfeiting pattern.

* * * * *